(12) United States Patent
Wang et al.

(10) Patent No.: US 7,619,707 B2
(45) Date of Patent: Nov. 17, 2009

(54) MULTI-DOMAIN LIQUID CRYSTAL DISPLAY

(75) Inventors: Wen-Chun Wang, Tai Chung (TW);
Chian-Chang Lee, Tai Chung (TW);
Chin-Chang Liu, Feng Yuan (TW);
Ying-Cheng Tsai, Pu Tai Town (TW);
Yi-Lin Chou, Shen Kan Hsiang (TW)

(73) Assignee: Wintek Corporation, Taichung (TW)

( * ) Notice: Subject to any disclaimer, the term of this patent is extended or adjusted under 35 U.S.C. 154(b) by 378 days.

(21) Appl. No.: 11/604,362

(22) Filed: Nov. 27, 2006

(65) Prior Publication Data

US 2007/0182901 A1    Aug. 9, 2007

(30) Foreign Application Priority Data

Feb. 9, 2006    (TW) ............... 95104430 A

(51) Int. Cl.
*G02F 1/1337* (2006.01)
(52) U.S. Cl. ..................................... 349/129
(58) Field of Classification Search ........................ None
See application file for complete search history.

(56) References Cited

U.S. PATENT DOCUMENTS

| | | | |
|---|---|---|---|
| 5,608,556 A * | 3/1997 | Koma | 349/143 |
| 6,233,034 B1 | 5/2001 | Lee et al. | |
| 6,462,798 B1 | 10/2002 | Kim et al. | |
| 6,678,027 B2 | 1/2004 | Park et al. | |
| 6,724,452 B1 | 4/2004 | Takeda et al. | |
| 6,839,104 B2 | 1/2005 | Taniguchi et al. | |
| 2004/0008313 A1 * | 1/2004 | Park et al. | 349/141 |
| 2005/0062924 A1 | 3/2005 | Ahn et al. | |
| 2005/0068481 A1 | 3/2005 | Kobayashi et al. | |
| 2007/0273819 A1 * | 11/2007 | Kawasaki et al. | 349/141 |

FOREIGN PATENT DOCUMENTS

CN    1603899    4/2005

* cited by examiner

*Primary Examiner*—Uyen-Chau N Le
*Assistant Examiner*—Chris Chu
(74) *Attorney, Agent, or Firm*—Muncy, Geissler, Olds & Lowe, PLLC

(57) ABSTRACT

A multi-domain liquid crystal display includes a first and a second substrates, and a liquid crystal layer is interposed between the first and the second substrates. A first common electrode is formed on an entire surface of the first substrate. A first dielectric layer is formed on the second substrate and covers first signal lines, and a second dielectric layer is formed on the first dielectric layer and covers second signal lines. A plurality of pixel electrodes are formed on the second dielectric layer, and a plurality of second common electrodes are formed on the second substrate, where a voltage difference existing between the second common electrodes and the pixel electrode produces fringe fields.

18 Claims, 30 Drawing Sheets

MULTI-DOMAIN LIQUID CRYSTAL DISPLAY

BACKGROUND OF THE INVENTION (a) Field of the Invention

The invention relates to a multi-domain liquid crystal display, particular to a multi-domain liquid crystal display where fringe fields are produced to regulate the orientation of liquid crystal molecules.

(b) Description of the Related Art

Typically, the display contrast ratio and response time offered by a VA (vertically-aligned) mode liquid crystal display, which uses negative liquid crystal materials and vertical alignment films, are better than a TN (twisted-nematic) mode LCD, since liquid crystal molecules are aligned in a vertical direction with zero voltage is applied. Also, it is known the viewing angle performance of a VA mode LCD is improved by setting the orientation directions of the liquid crystal molecules inside each pixel to a plurality of mutually different directions; that is, forming multiple independent domains in the liquid crystal display.

FIG. 1A shows a schematic diagram illustrating a conventional design of a multi-domain vertically-aligned liquid crystal display (MVA LCD). Referring to FIG. 1A, a top substrate 102 and a bottom substrate 104 are both provided with protrusions 106 having different inclined surfaces and covered by vertical alignment films 108. Hence, the liquid crystal molecules 112 near the inclined surfaces orientate vertically to the inclined surfaces to have different degrees of pre-tilt angles. In case the pre-tilt liquid crystal molecules exist, surrounding liquid crystal molecules 112 are tilted in the directions of the pre-tilt liquid crystal molecules 112 when a voltage is applied. Thus, multiple domains each having individual orientation direction of liquid crystal molecules 112 are formed. Besides, the domain-regulating structure for providing inclined surfaces includes, but is not limited to, the protrusions 106, and other structure such as a via structure 116 shown in FIG. 1B may also be used.

However, when one compares the optical path of light l1 and that of light l2 shown both in FIGS. 1A and 1B, it is clearly found the pre-tilt liquid crystal molecules through which the light l2 passes under a field-off state may result in a non-zero phase difference (.nd.0) to cause light leakage. Accordingly, additional compensation films must be provided to eliminate the light leakage.

FIG. 2 shows a schematic diagram illustrating another conventional design of an MVA LCD. Referring to FIG. 2, the transparent electrode 204 on the substrate 202 is provided with slits 206. Because of the fringe fields produced at edges of transparent electrode 204 and at each slit 206, the liquid crystal molecules 208 are tilted toward the center of each slit 206 to result in a multi-domain LCD cell. However, the strength of the fringe fields generated by the formation of the slits 206 is often insufficient, particularly when the widths and the intervals of the slits 206 are not optimized. Besides, since the azimuth in which the liquid crystal molecules tilt due to fringe fields includes all directions of 360 degrees, a disclination region 210 often appears beyond the slits 206 or between two adjacent slits 206 to result in a reduced light transmittance.

BRIEF SUMMARY OF THE INVENTION

Hence, an object of the invention is to provide a multi-domain liquid crystal display that allows for solving the problems of conventional designs as mentioned above.

According to the invention, a multi-domain liquid crystal display includes a first and a second substrates, and a liquid crystal layer having negative dielectric anisotropy is interposed between the first and the second substrates. A first common electrode is formed on an entire surface of the first substrate, and a plurality of first and second signal lines are provided on the second substrate, where two adjacent first signal lines are intersected with two adjacent second signal lines to define a pixel region. A plurality of switching devices are provided in the vicinity of intersections of the first and second signal lines. A first dielectric layer is formed on the second substrate and covers the first signal lines, and a second dielectric layer is formed on the first dielectric layer and covers the second signal lines. A plurality of pixel electrodes are formed on the second dielectric layer, and a plurality of second common electrodes are formed on the second substrate, where a voltage difference existing between the second common electrodes and the pixel electrode produces fringe fields. Further, each second common electrode may include multiple sections that define at least one enclosed region, with each enclosed region overlapping with the pixel electrode to regulate the orientation of liquid crystal molecules.

Through the design of the invention, a multi-domain profile of a liquid crystal cell is formed by means of common electrode sections defined from a Metal 1, Metal 2, or Metal 3 layer, which are formed accompanied by typical TFT fabrication processes to produce fringe fields. Thus, compared with the conventional design where a protrusion or a via structure is used to tilt liquid crystal molecules, the residue phase difference is eliminated to avoid light leakage. Further, compared with another conventional design where slits are formed to produce fringe fields, the biased electrode allows for stronger field strength to tilt liquid crystal molecules so as to reduce the areas of a disclination region and further increase the light-transmittance of an LCD.

Also, according to the invention, the Metal 1, Metal 2, or Metal 3 layer may be patterned to form the common electrode sections as well as a reflective layer under the same fabrication process, and thus the fabrication of a transflective multi-domain liquid crystal display is simplified.

DETAILED DESCRIPTION OF THE INVENTION

Figure 1A:
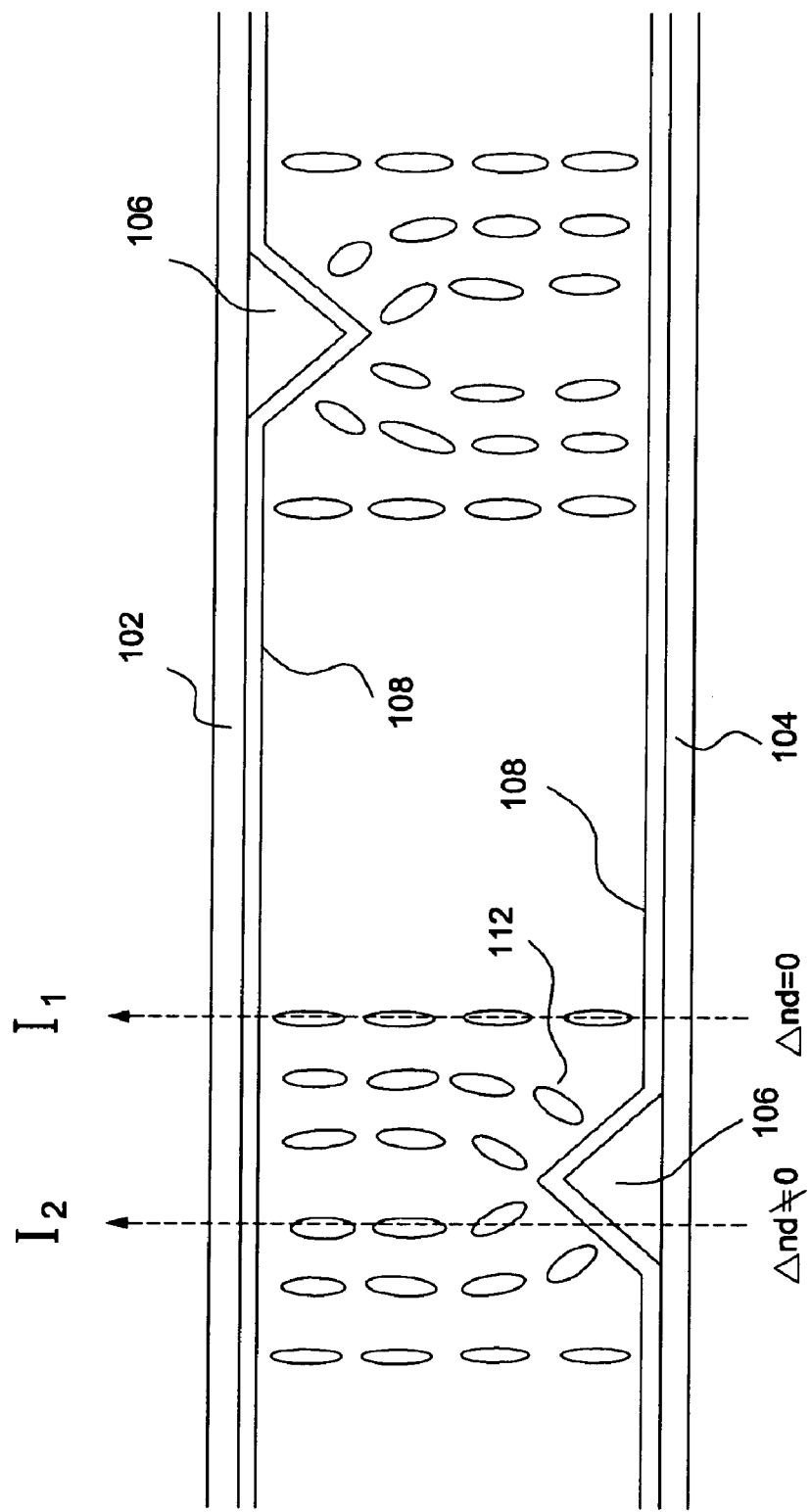
FIG. 1A shows a schematic diagram illustrating a conventional design of a multi-domain vertically-aligned liquid crystal display.
Figure 1B:
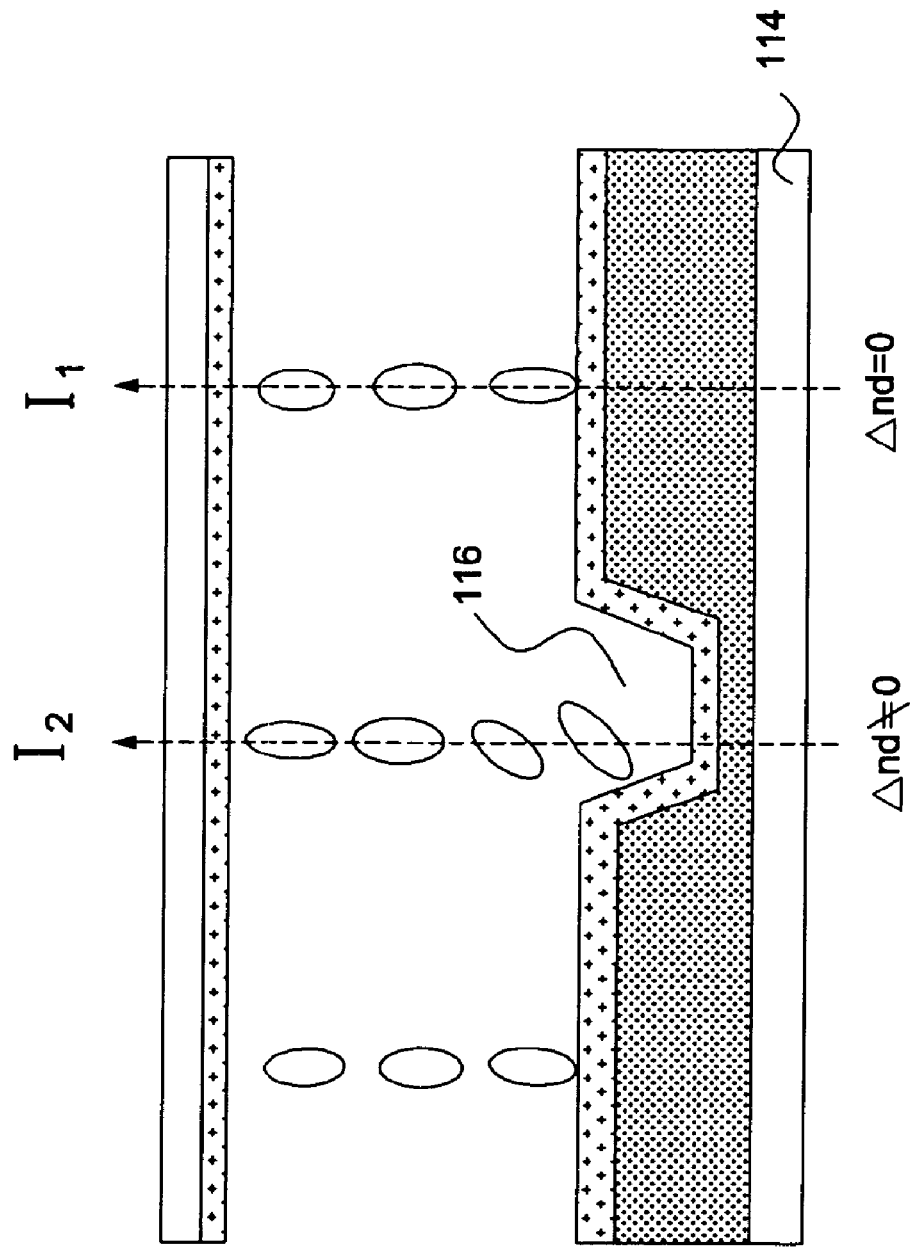
FIG. 1B shows a schematic diagram illustrating another conventional design of a multi-domain vertically-aligned liquid crystal display.
Figure 2:
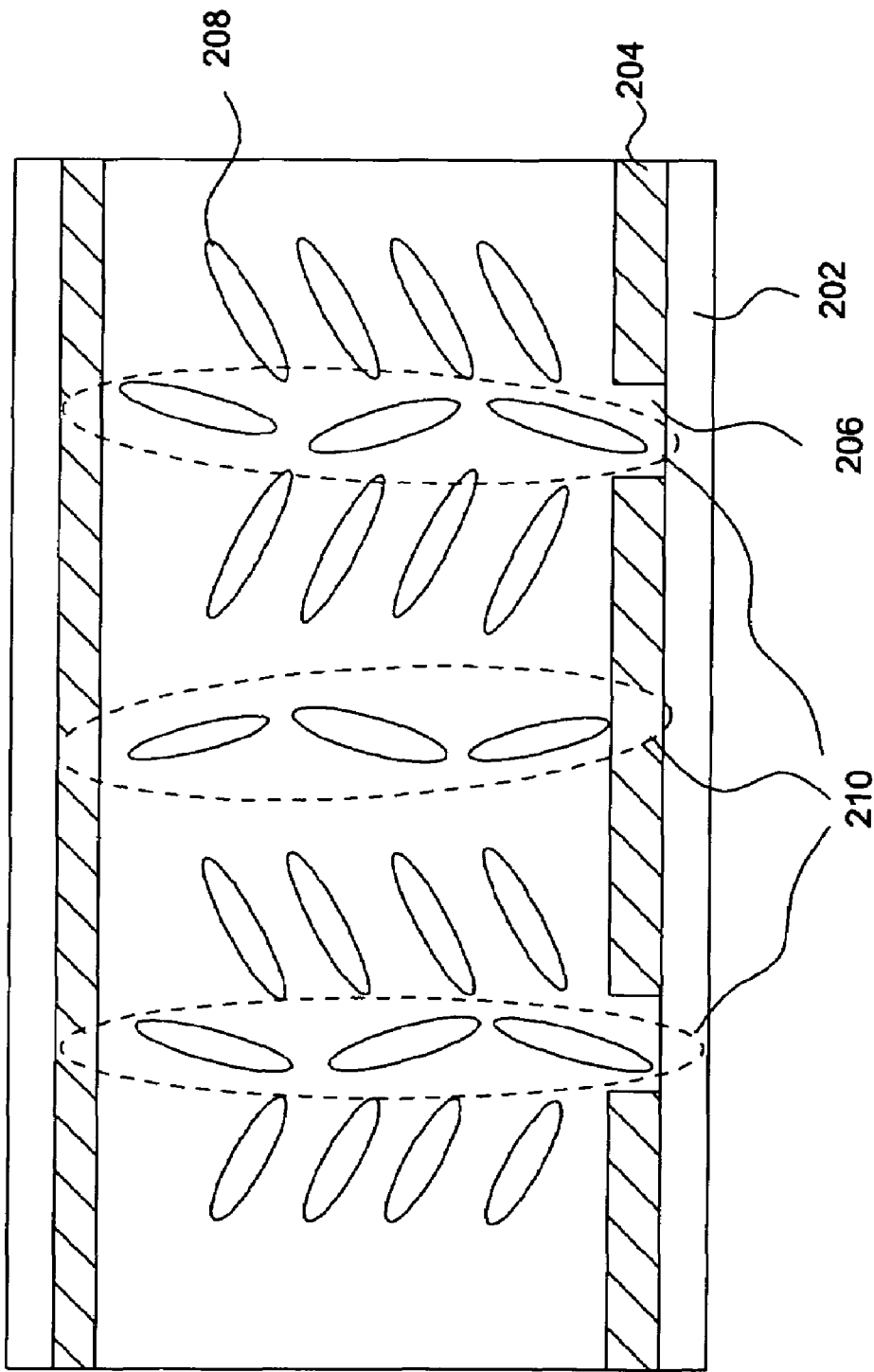
FIG. 2 shows a schematic diagram illustrating another conventional design of a multi-domain vertically-aligned liquid crystal display.
Figure 3:
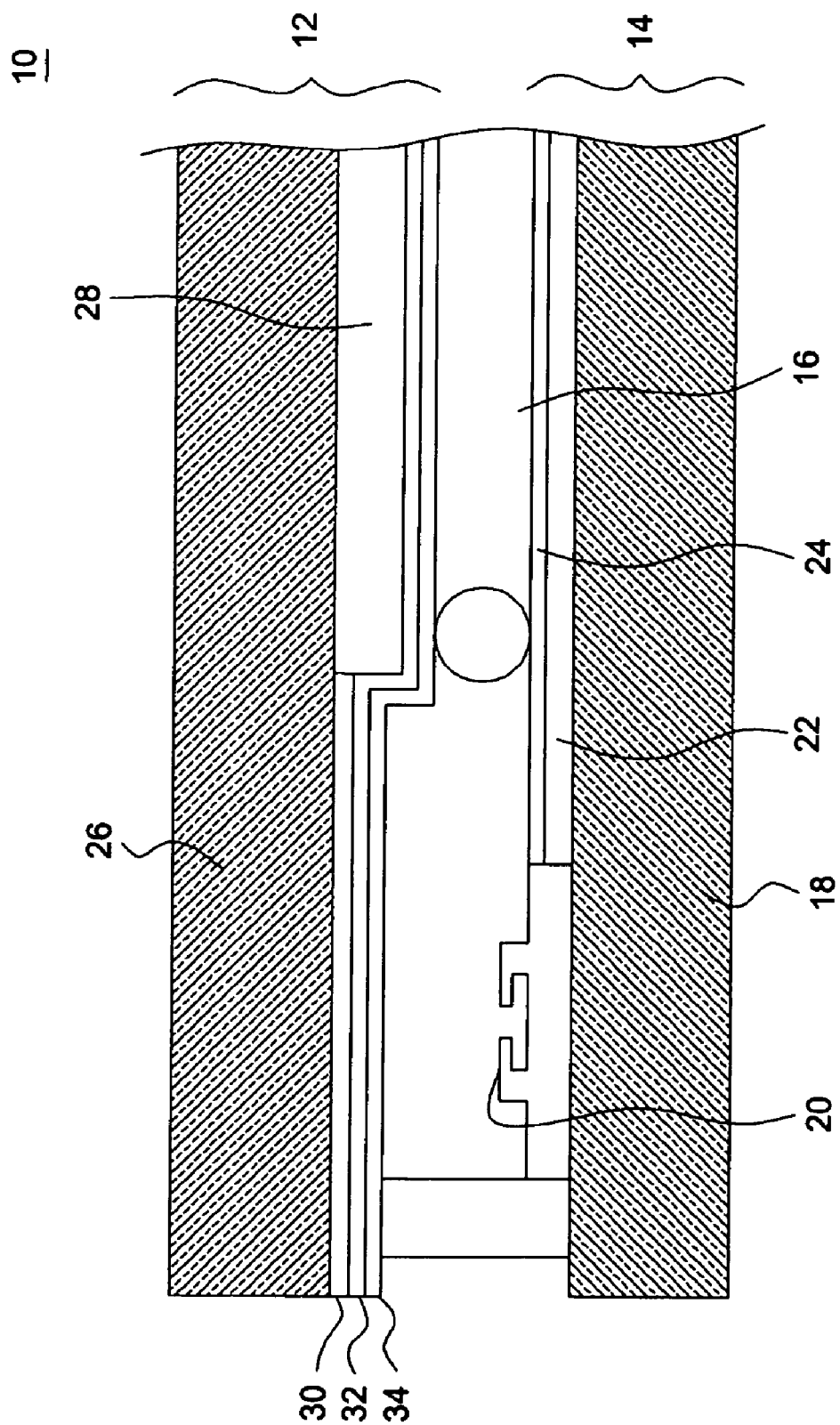
FIG. 3 shows a cross-section illustrating a multi-domain liquid crystal display according to an embodiment of the invention.

FIG. 3 shows a cross-section illustrating a multi-domain liquid crystal display according to an embodiment of the invention. Referring to FIG. 3, the multi-domain liquid crystal display 10 includes a color filter substrate 12 and an array substrate 14, with a liquid crystal layer 16 having negative dielectric anisotropy interposed between them where the liquid crystal molecules are vertically-aligned without being applied with voltage. Further, an additive of chiral dopant may be added to the liquid crystal layer 16 to adjust the twist pitch to a desired value so as to reduce the areas of a disclination region. In the array substrate 14, a switching device 20 such as a thin film transistor (TFT), a pixel electrode 22, and a first alignment layer 24 are formed on a transparent substrate 18. Further, in the color filter substrate 12, a color filter 28, a black matrix layer 30, a common electrode 32, and a second alignment layer 34 are formed on a transparent substrate 26.

Note that, as used in this description and in the appended claims, the meaning of the phrase "layer A is formed or provided on layer B" is not limited to a direct contact between the layer A and the layer B. For instance, in an embodiment where laminates are interposed between the upper layer A and the lower layer B is encompassed within the scope of the phrase "layer A is formed or provided on layer B".

Figure 4:
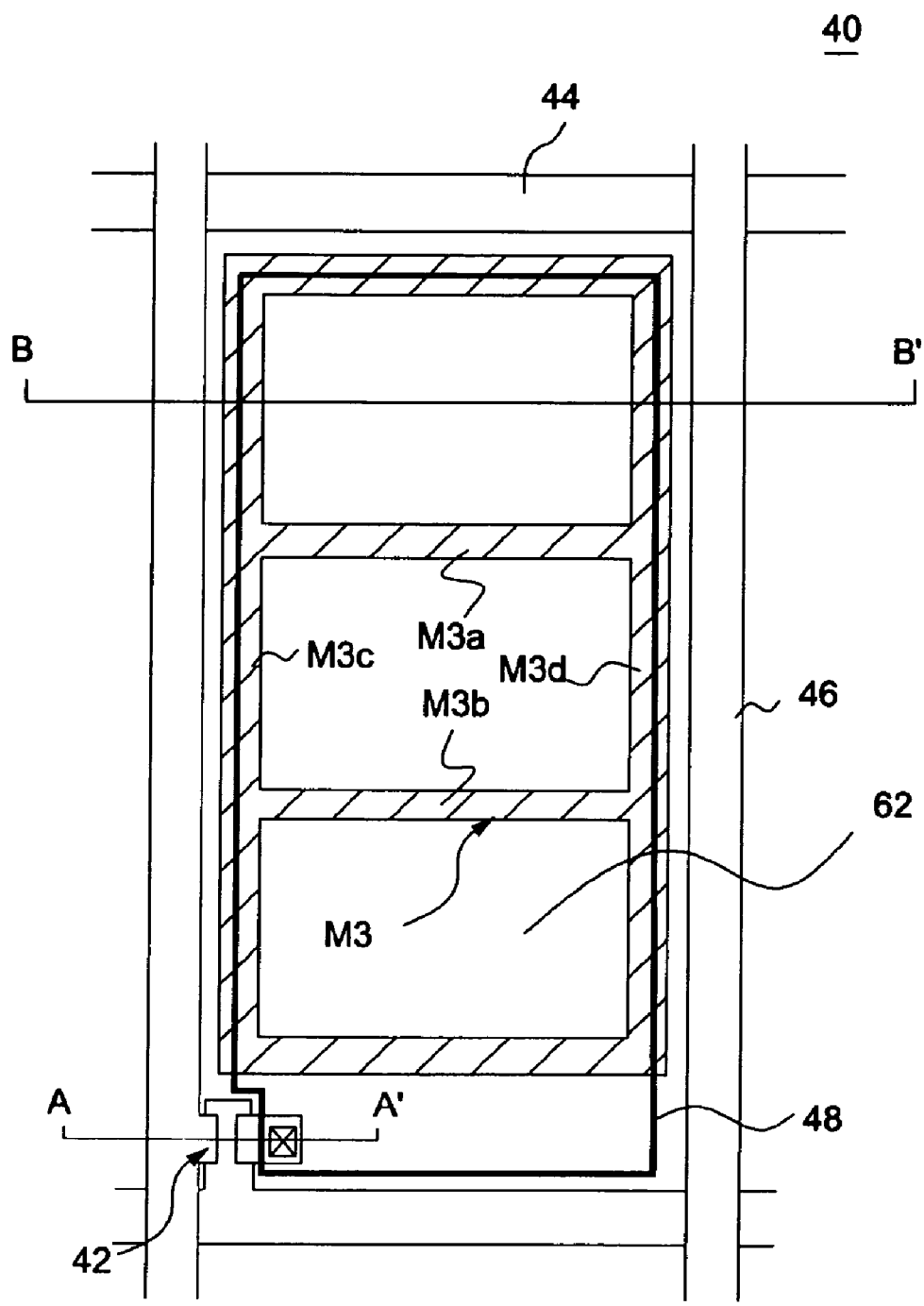
FIG. 4 shows a plan view observed from the normal direction of an array substrate according to an embodiment of the invention.
Figure 5A:
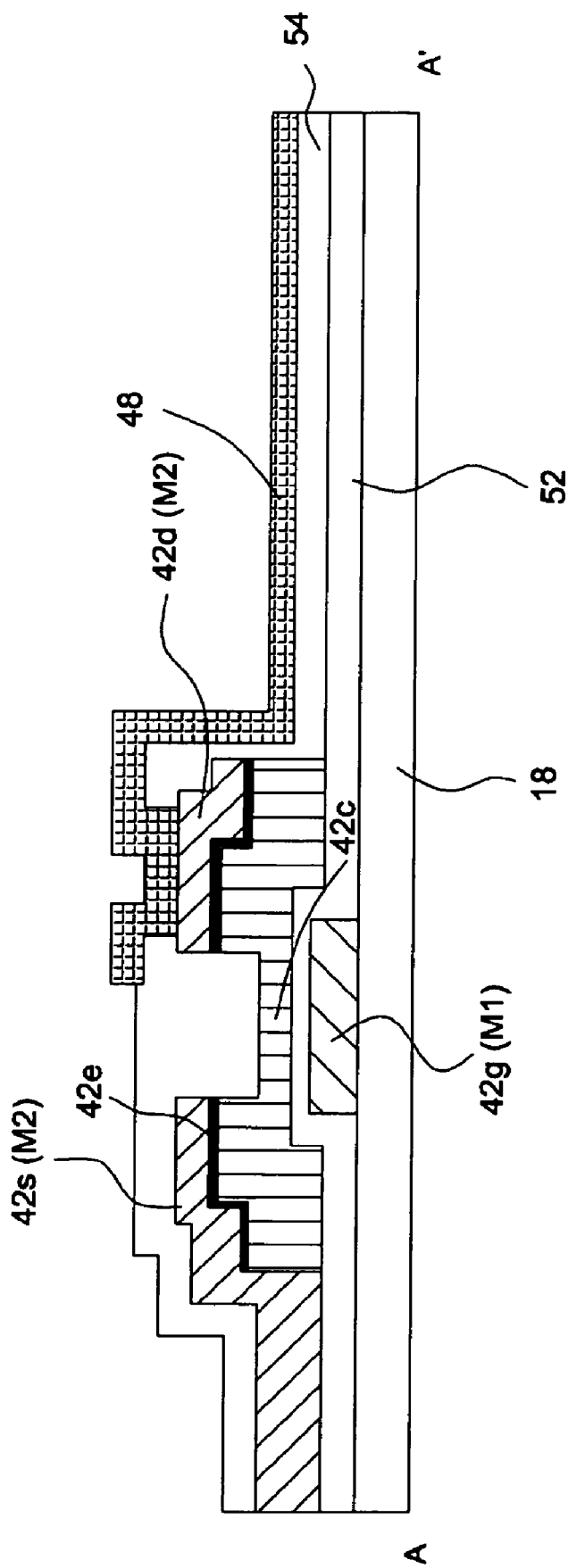
FIG. 5A shows a cross-sectional view taken along line A-A' in FIG. 4.
Figure 5B:
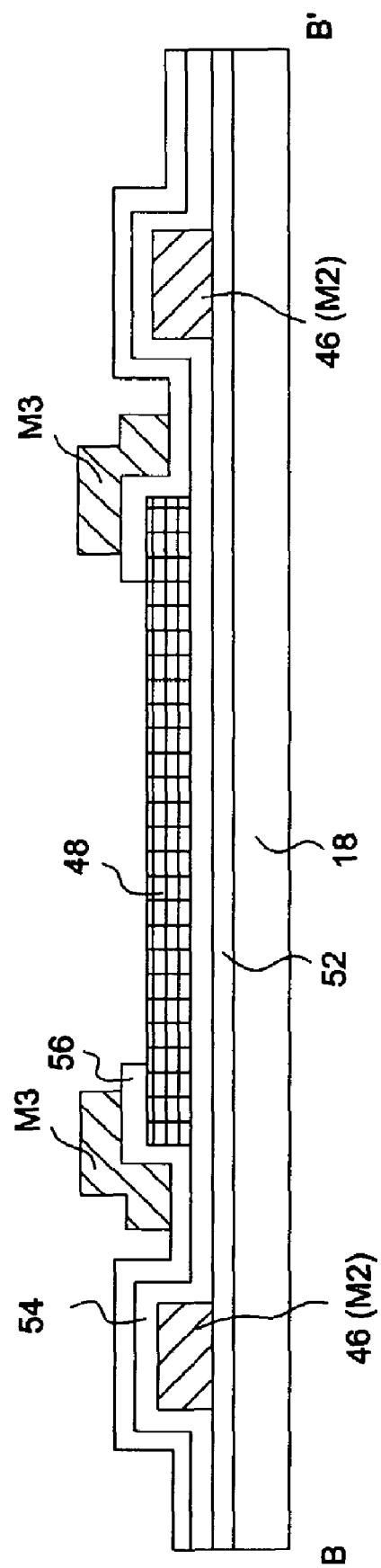
FIG. 5B shows a cross-sectional view taken along line B-B' in FIG. 4.

FIG. 4 shows a plan view observed from the normal direction of an array substrate according to an embodiment of the invention. FIG. 5A shows a cross-sectional view taken along line A-A' in FIG. 4, and FIG. 5B shows a cross-sectional view taken along line B-B' in FIG. 4.

Referring to FIG. 4, a plurality of gate lines 44 are arranged extending in the lateral direction of a pixel 40, and a plurality of data lines 46 are arranged extending in the lengthwise direction of the pixel 40, with each two gate lines 44 intersected with each two data lines 46 to define a pixel region on the array substrate 14. A pixel electrode 48 made of transparent conductive films is spread on each pixel region, and the transparent conductive films may be made from indium tin oxide (ITO) or indium zinc oxide (IZO). A switching device such as an amorphous silicon thin film transistor (a-Si TFT) 42 is formed in the vicinity of each intersection of the gate lines 44 and the data lines 46.

Referring to FIG. 5A, a Metal 1 layer M1 made from Cr, Ta, or Al/Mo metallic films is deposited on the transparent substrate 18 and patterned to define the gate lines 44 and the gate 42g of the a-Si TFT 42. A dielectric gate insulation layer 52 is formed overlying the Metal 1 layer M1. For example, the gate insulation layer 52 may be formed by depositing silicon nitride (SiNx) on the Metal 1 layer M1 through chemical vapor deposition. A channel region 42c (pure amorphous silicon (a-Si:H)), an ohmic contact layer 42e (doped amorphous silicon (n+ a-Si:H)) and a Metal 2 layer M2 are formed on the gate insulation layer 52. Specifically, the Metal 2 layer M2 made from Al/Cr, Al/Ti, Ti, or Mo/Al/Mo metallic films is sputtered on the gate insulation layer 52 and patterned to define the source 42s and the drain 42d of the a-Si TFT 42 and the data lines 46. The source 42s and the drain 42d of the a-Si TFT 42 are provided at two sides of the channel region 42c.

A dielectric passivation layer 54 is formed overlying the gate insulation layer 52 and the Metal 2 layer M2 to cover the source 42s and the drain 42d of the a-Si TFT 42 and the data lines 46. The passivation layer 54 may be made from silicon nitride (SiNx), acrylic resin, or polyimide. Then, transparent conductive films made from indium tin oxide (ITO) or indium zinc oxide (IZO) are deposited on the passivation layer 54 and patterned to form the pixel electrode 48. The gate 42g, the source 42s and the drain 42d of the a-Si TFT 42 are respectively connected to the gate lines 44, the data lines 46, and the pixel electrode 48.

When the above typical TFT fabrication processes finish, according to the invention, another dielectric layer 56 and a Metal 3 layer M3 are sequentially formed on the pixel electrode 48, as shown in FIG. 5B. The dielectric layer 56 may be made from silicon nitride (SiNx), acrylic resin, or polyimide. The Metal 3 layer M3 is deposited on the dielectric layer 56 and wired up to the common electrode 32 on the color filer substrate (shown in FIG. 3), so that the Metal 3 layer M3 is provided with a voltage potential Vcom and thus functions as another common electrode on the array substrate 14. Further, the Metal 3 layer M3 may be made of transparent conductive films such as ITO and IZO, or made of metallic conductive films such as Al/Nd or Al/Mo.

The distribution of the Metal 3 layer M3 on the dielectric layer 56 and its accompanying effect are described below.

First, as indicated by the hatched lines shown in FIG. 4, the Metal 3 layer M3 includes multiple strip-shaped sections that extend parallel to the gate lines 44 (such as sections M3a and M3b) or parallel to the data lines 46 (such as sections M3c and M3d), and all strip-shaped sections define multiple rectangular enclosed regions 62, such as three rectangular enclosed regions 62 shown in FIG. 4. Since each enclosed region 62 overlaps with the pixel electrode 48, a voltage difference exists between each common electrode section M3a, M3b, M3c or M3d and the pixel electrode 48 produces fringe fields.

The operation principle about how the Metal 3 layer M3 (common electrode) induces fringe fields to tilt liquid crystal molecules is described below with reference to FIGS. 6A and 6B.

Figure 6A:
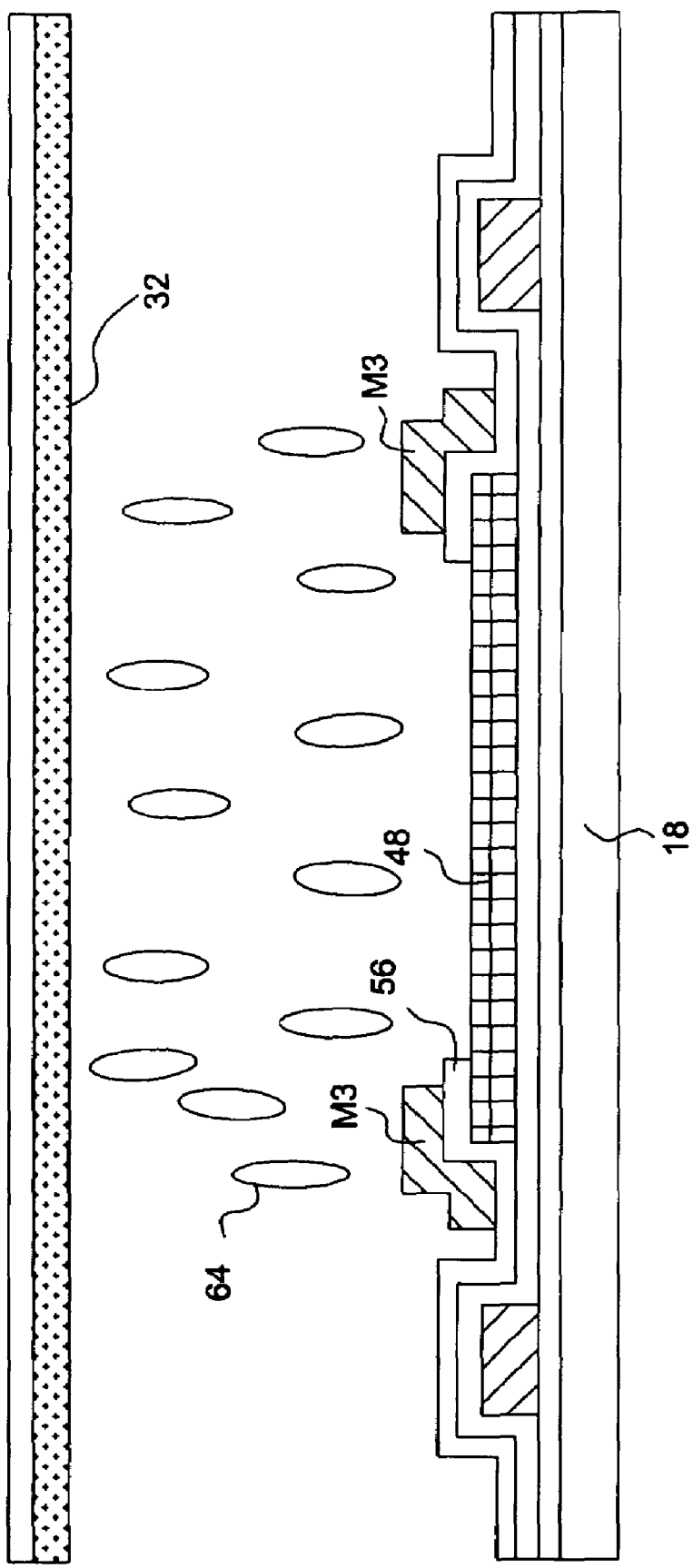
FIGS. 6A and 6B show schematic diagrams illustrating the operation principle according to the invention.
Figure 6B:
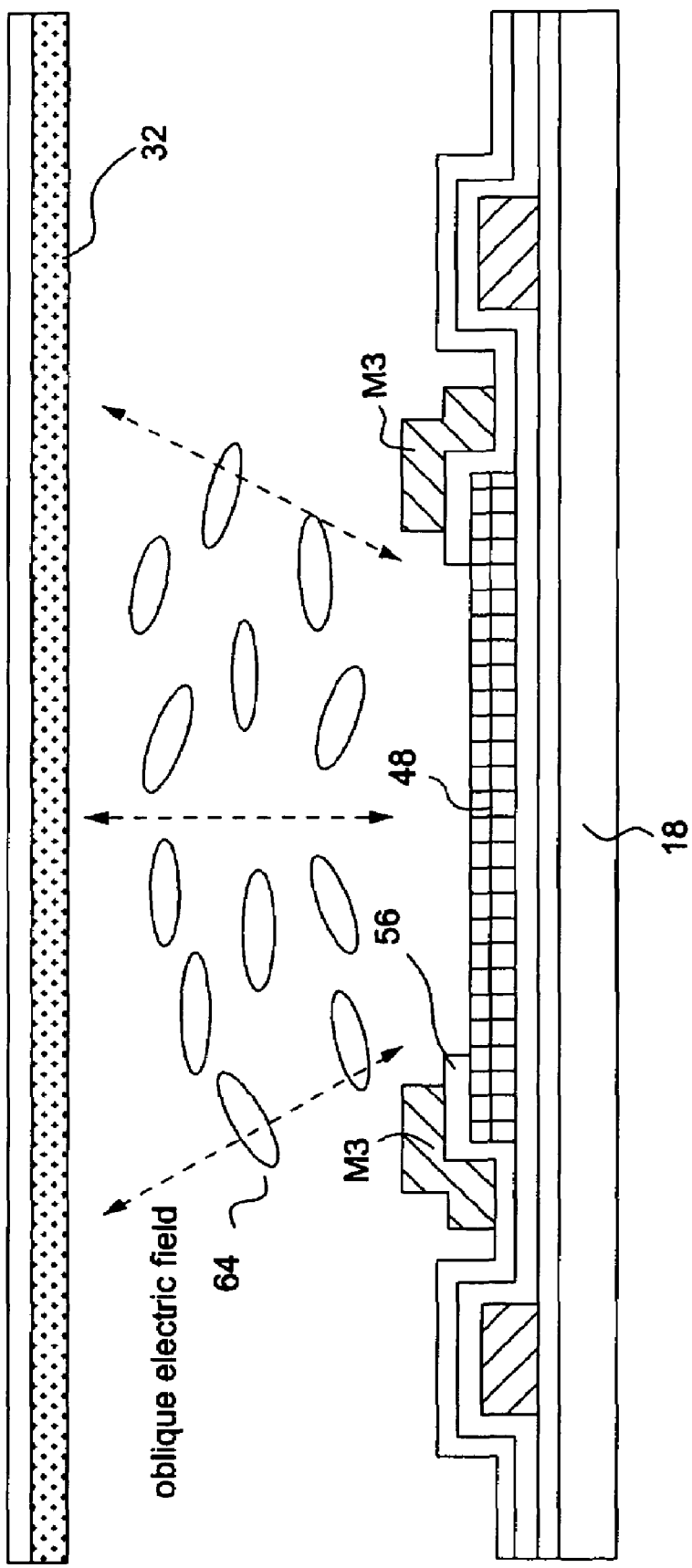

Referring to FIG. 6A, when no voltage is applied across a common electrode 32 and the pixel electrode 48, the liquid crystal molecules 64 with negative dielectric anisotropy are naturally vertically-aligned. Then, when a voltage is applied across the common electrode 32 and the pixel electrode 48 for a period, fringe fields are produced due to the voltage difference between the Metal 3 layer (having a voltage potential Vcom) and the pixel electrode 48 (having a voltage potential Vpixel). Thus, the liquid crystal molecules 64 are directed to a direction perpendicular to the oblique electric field as indicated in FIG. 6B. In that case, since each enclosed region are defined by four common electrode sections M3a, M3b, M3c, and M3d, the orientation of liquid crystal molecules 64 within one pixel is divided into four tilt directions in relation to the four common electrode sections to obtain a four-domain profile of a liquid crystal cell.

Figure 7:
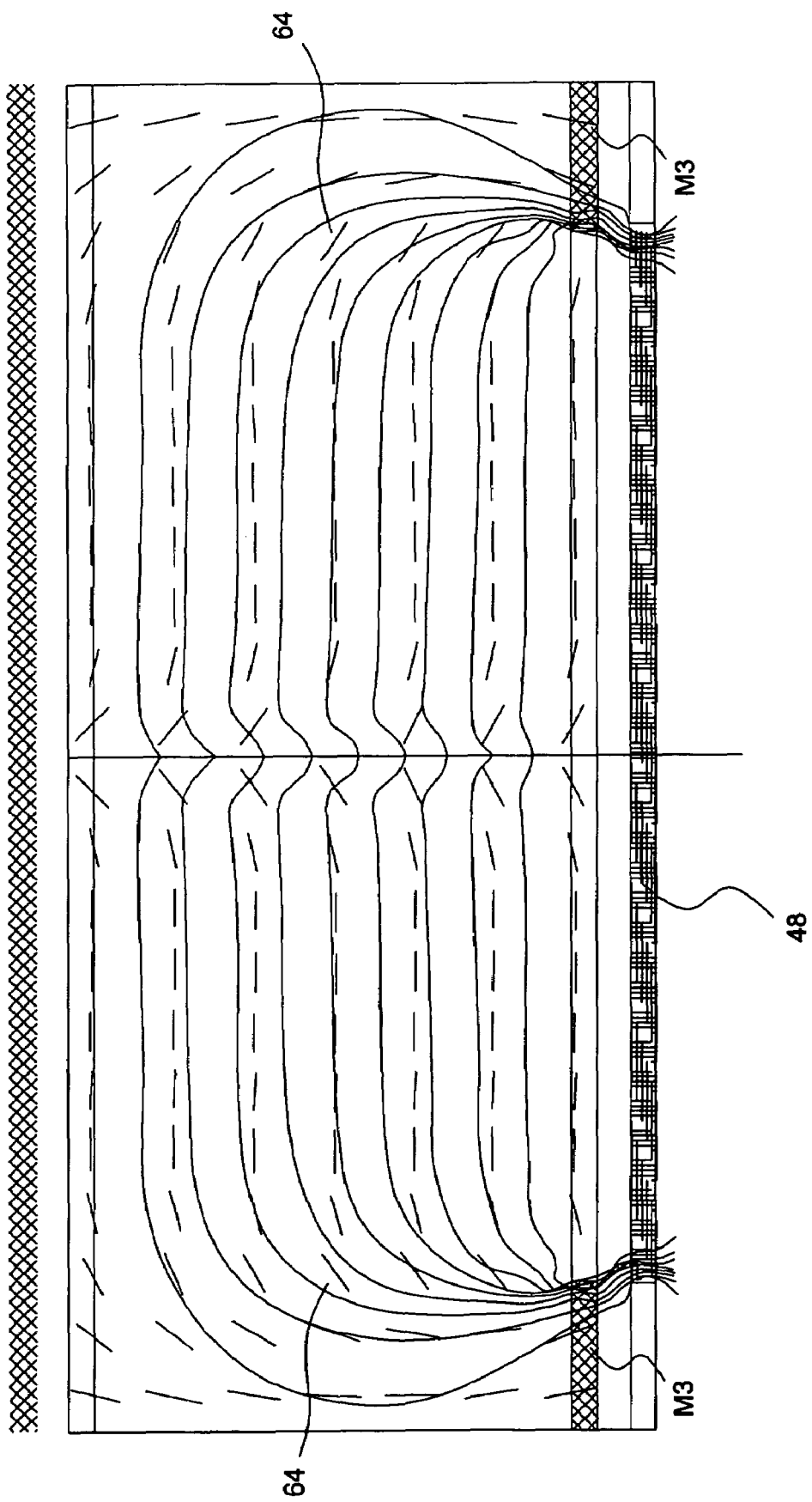
FIG. 7 shows a simulation diagram illustrating the distribution of tilted liquid crystal molecules.

FIG. 7 shows a simulation diagram illustrating the distribution of tilted liquid crystal molecules. Referring to FIG. 7, it can be clearly seen the liquid crystal molecules 64 spread in the two sides of the pixel electrode 48 are slanted toward the center of the pixel electrode 48 due to the voltage difference between the Metal 3 layer M3 and the pixel electrode 48.

According to this embodiment, a multi-domain profile of a liquid crystal cell is formed by means of common electrode sections of the Metal 3 layer M3, which are formed accompanied by typical TFT fabrication processes to produce fringe fields. Thus, compared with the conventional design where a protrusion or a via structure is used to tilt liquid crystal molecules, the residue phase difference is eliminated to avoid light leakage. Further, compared with another conventional design where slits are formed to produce fringe fields, the biased electrode allows for stronger field strength to tilt liquid crystal molecules so as to reduce the areas of a disclination region and further increase the light-transmittance of an LCD.

Figure 8:
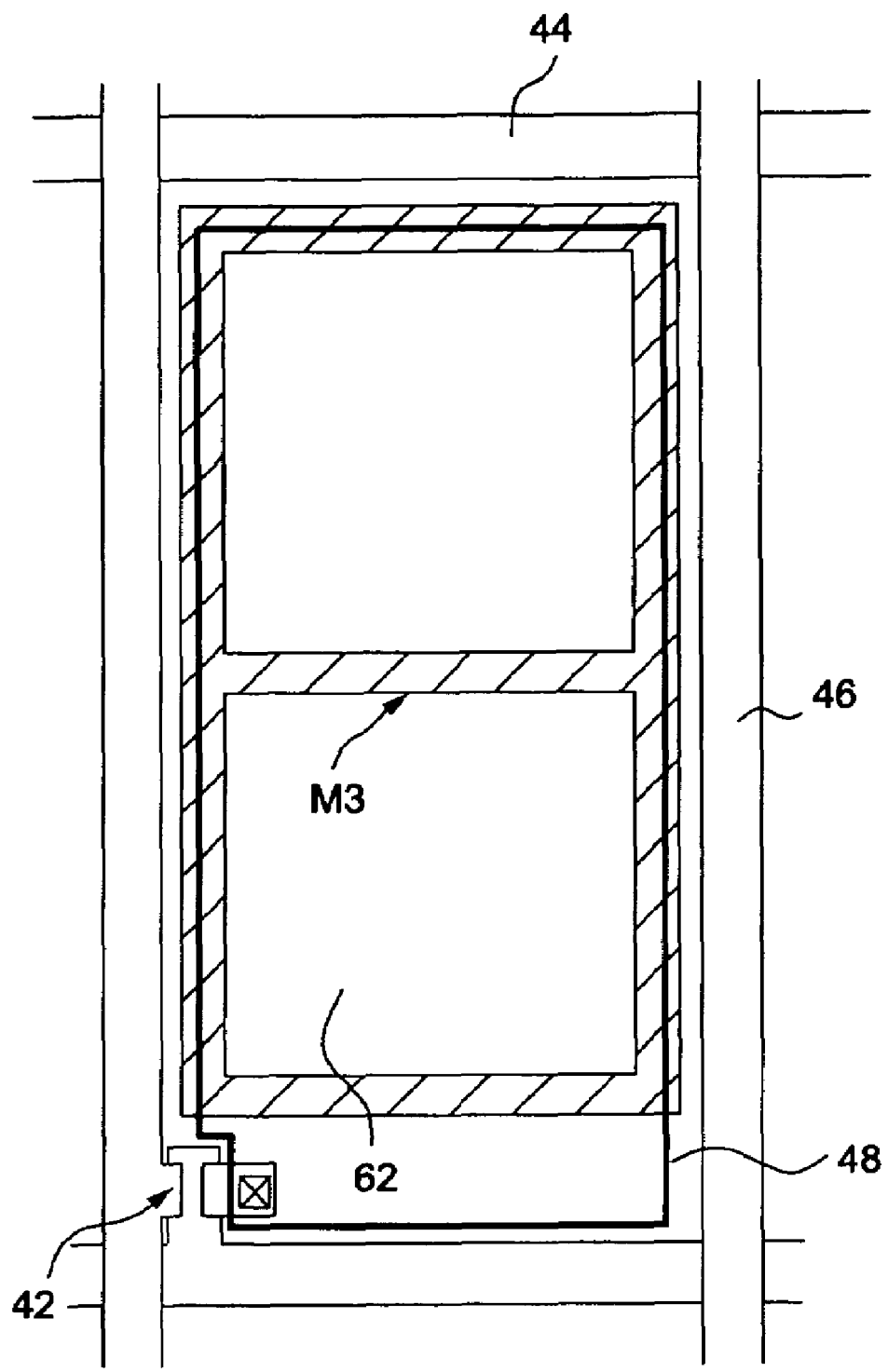
FIG. 8 shows a plan view illustrating the distribution of the common electrode sections according to another embodiment of the invention.
Figure 9:
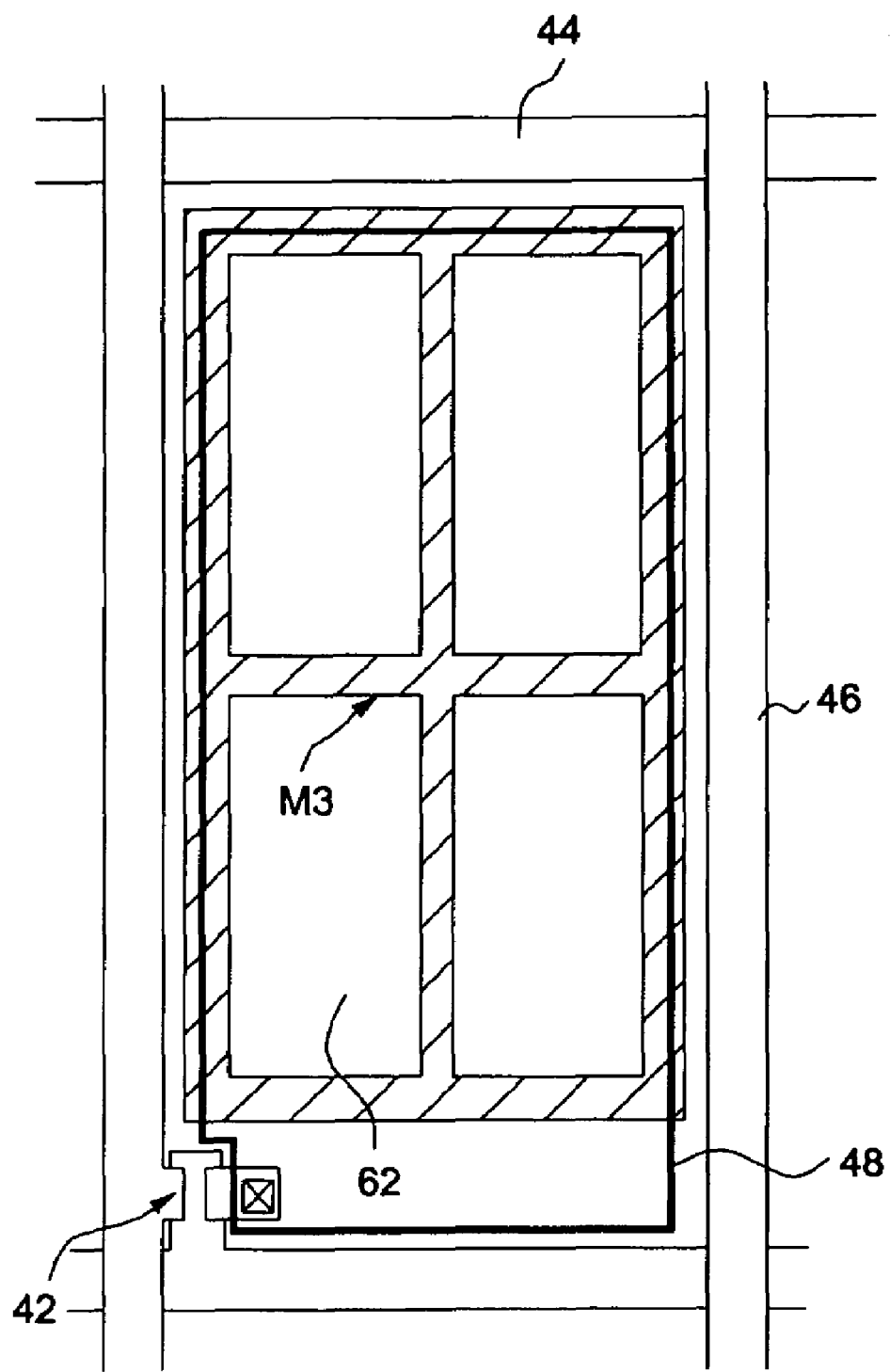
FIG. 9 shows a plan view illustrating the distribution of the common electrode sections according to another embodiment of the invention.
Figure 10:
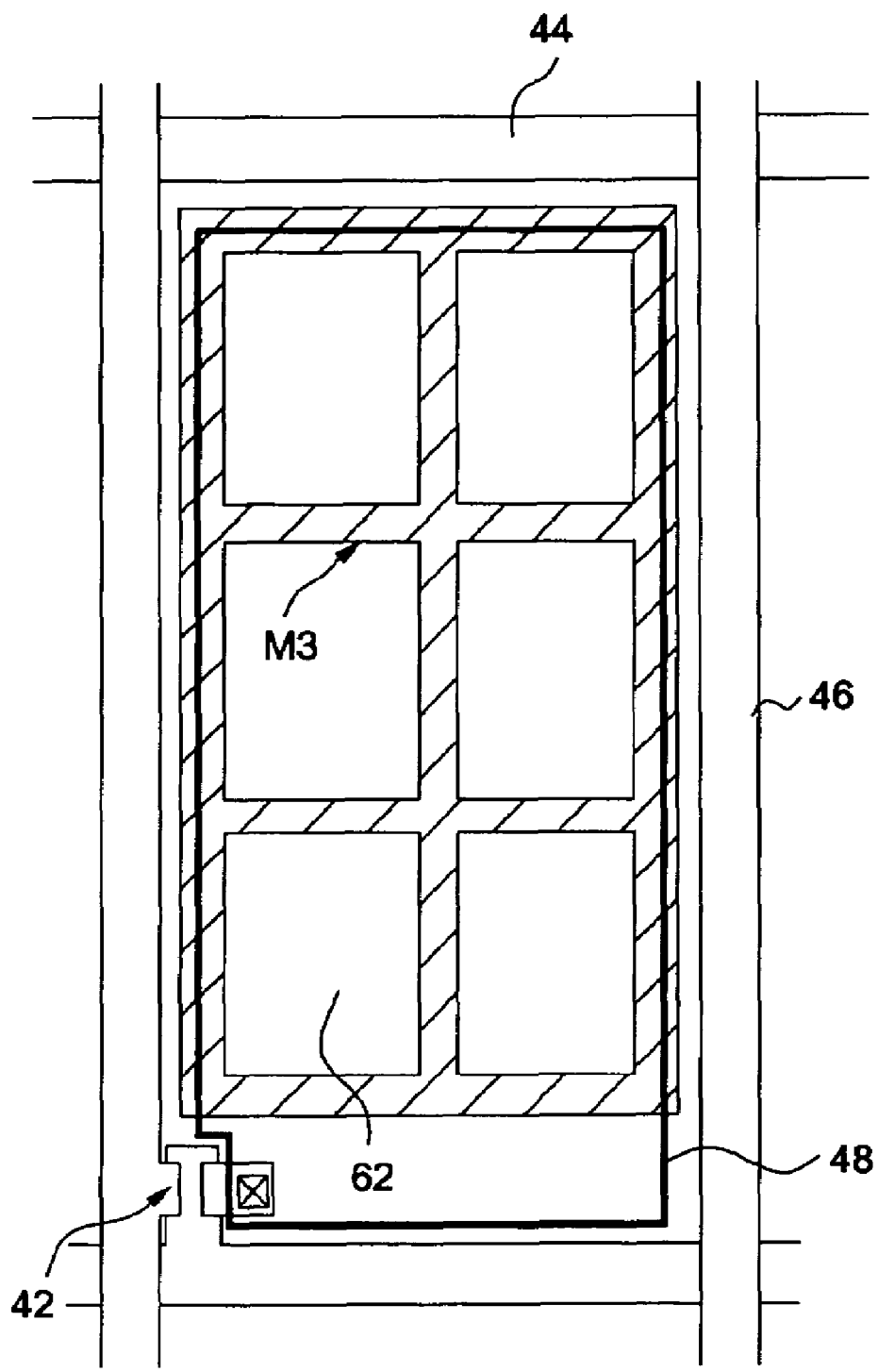
FIG. 10 shows a plan view illustrating the distribution of the common electrode sections according to another embodiment of the invention.

Referring again to FIG. 4, though each pixel region is divided into three enclosed regions 62 each surrounded by four common electrode sections M3a-M3d, this division is not limited. In an alternate embodiment, each pixel region may be divided by the Metal 3 layer M3 into two enclosed regions 62, as shown in FIG. 8. Alternatively, each pixel region may be divided into four or six enclosed regions 62 arranged in two columns, as shown in FIG. 9 and FIG. 10. Though the response time of liquid crystal molecules is reduced as the number of the enclosed regions 62 in each pixel region is increased, such division is not limited and is determined according to the actual demand.

Figure 11:
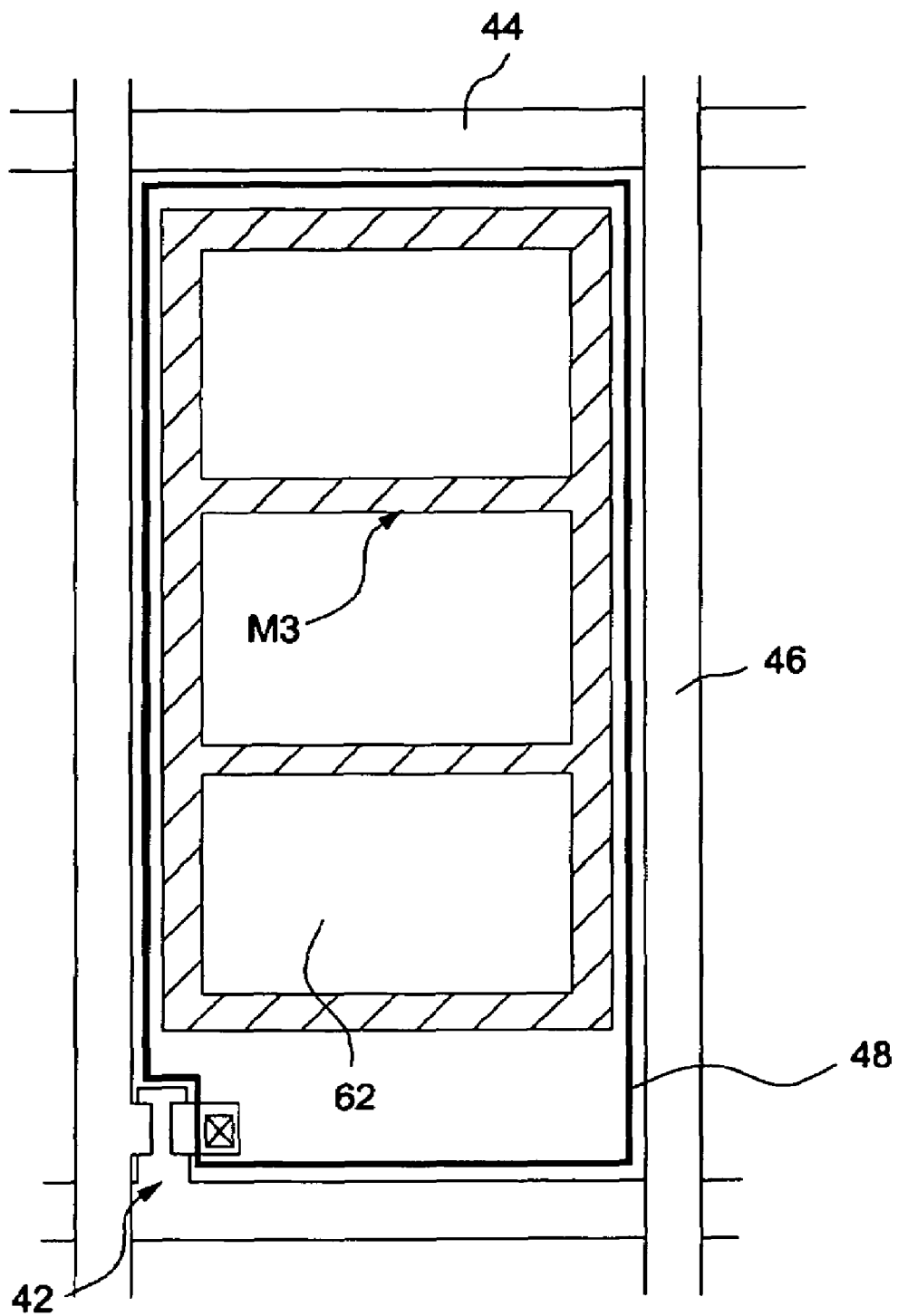
FIG. 11 shows a plan view illustrating the distribution of the common electrode sections according to another embodiment of the invention.

Further, the relative positions of the Metal 3 layer M3 and the pixel electrode 48 are not limited as long as sufficient field strength is provided. In one embodiment, the periphery portions of the Metal 3 layer M3 are outside the projection of the pixel electrode 48, as shown in FIG. 4. In an alternate embodiment, the periphery portions of the pixel electrode 48 are outside the projection of the Metal 3 layer M3, as shown in FIG. 11.

Moreover, according to the design of the invention, the overlapped portions between the Metal 3 layer M3 and the pixel electrode 48 also form a storage capacitor Cst, with the dielectric layer 56 interposed between them.

Figure 12:
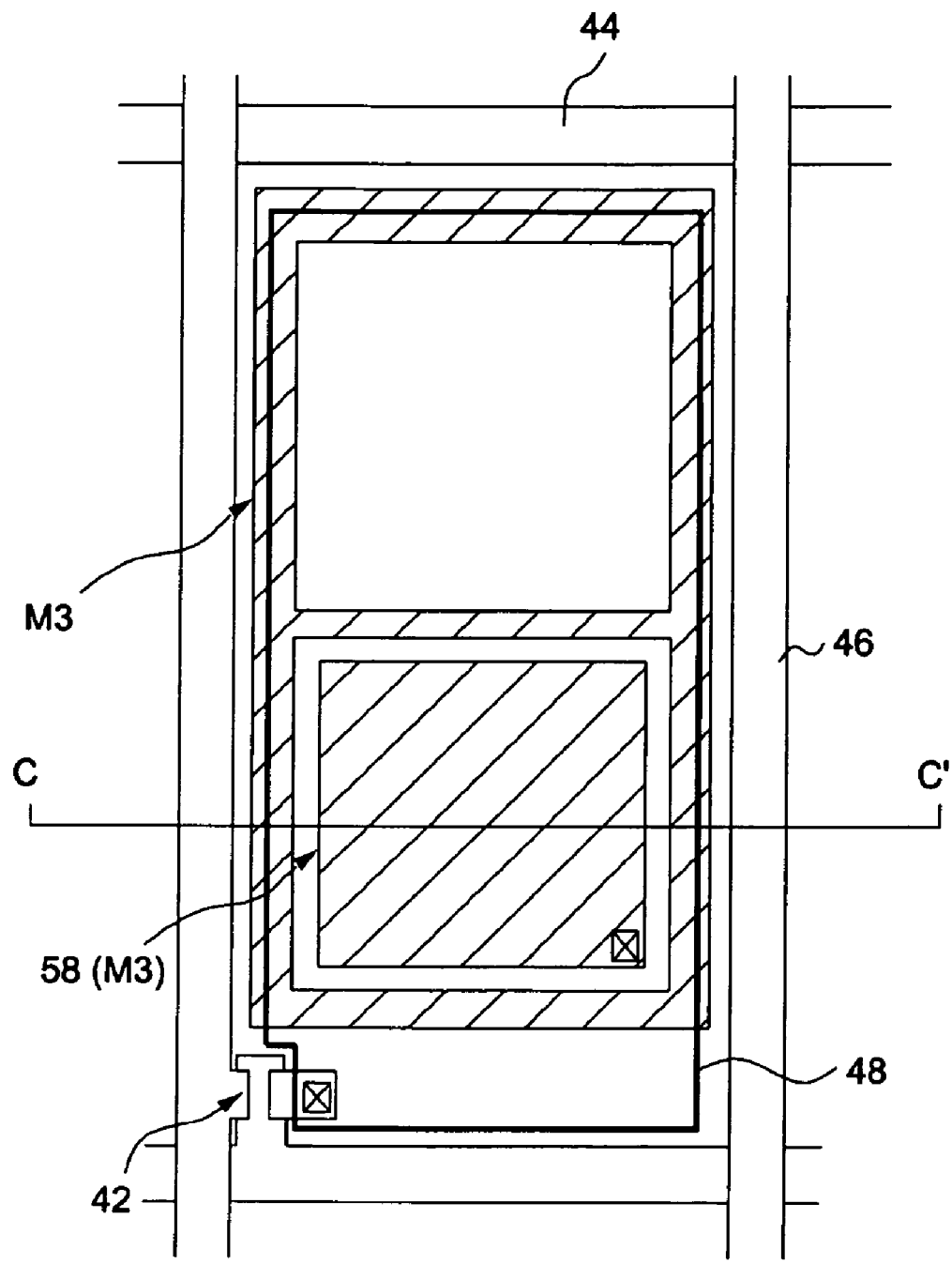
FIG. 12 shows a plan view illustrating a transflective pixel structure according to an embodiment of the invention.
Figure 13:
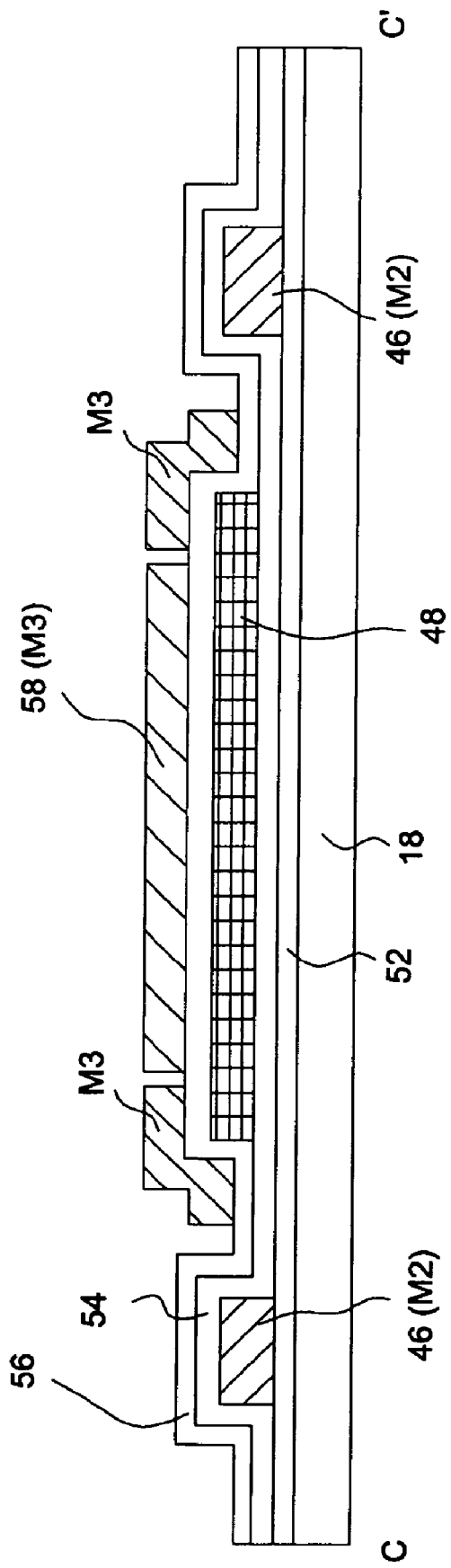
FIG. 13 shows a cross-sectional view taken along line C-C' in FIG. 12.
Figure 14:
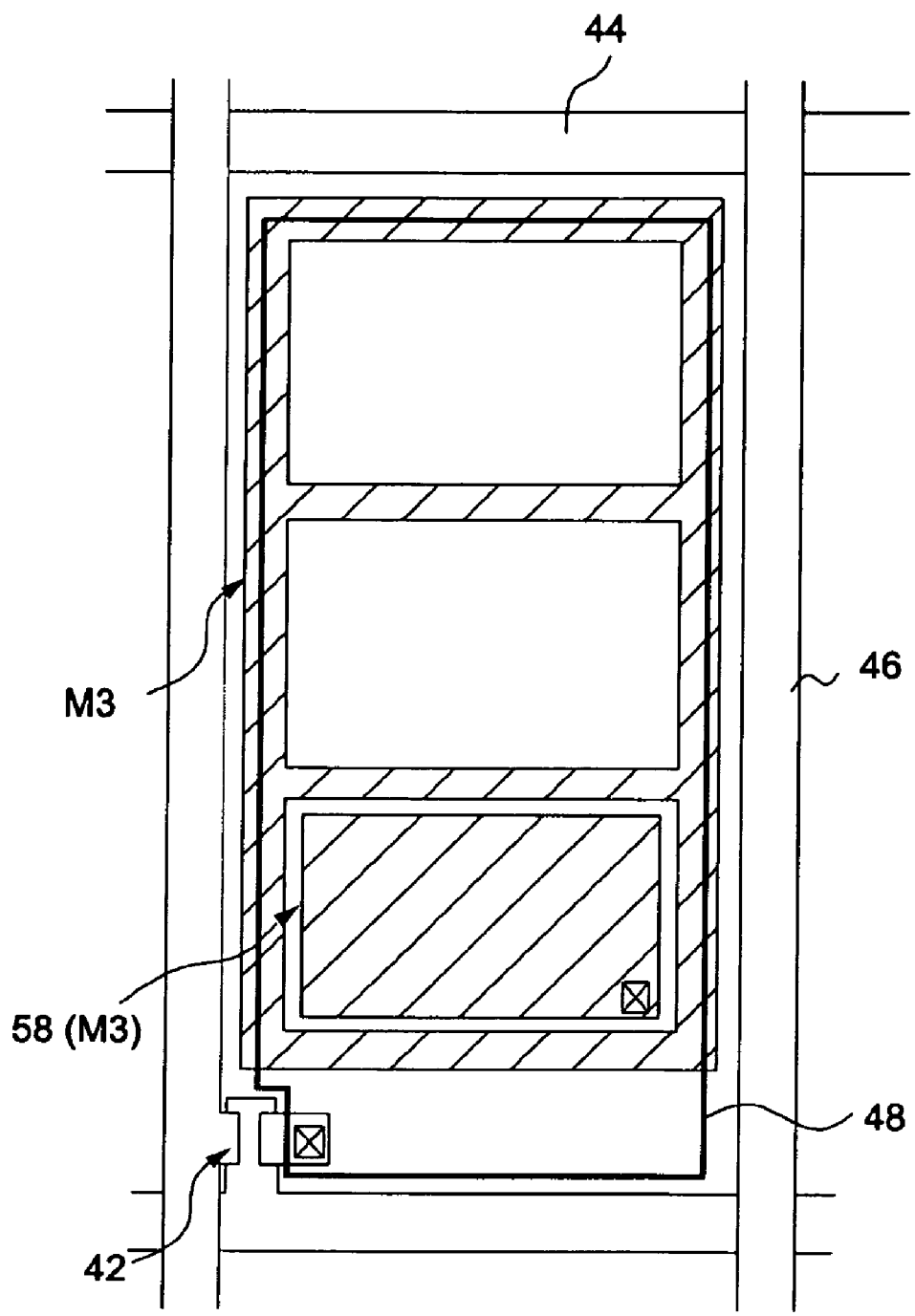
FIG. 14 shows a plan view illustrating a transflective pixel structure according to another embodiment of the invention.

FIG. 12 shows a plan view illustrating a transflective pixel structure 60 according to another embodiment of the invention, and FIG. 13 is a cross-sectional view taken along line C-C' in FIG. 12. According to this embodiment, the Metal 3 layer M3 that cooperates with the pixel electrode 48 to produce fringe fields is made of metallic materials having high reflectivity. As shown in FIG. 12 and FIG. 13, the reflective Metal 3 layer M3 is patterned to form multiple common electrode sections used to produce fringe fields and a reflective layer 58. The reflective layer 58, which constitutes the reflective region of the transflective pixel structure 60, is surrounded by the common electrode sections and maintains a gap apart from them. Certainly, the area of the reflective layer 58 may be arbitrary selected depending on any factor such as environmental brightness. For example, as shown in FIG. 14, in case the Metal 3 layer M3 divides a pixel region into three rectangular enclosed regions 62, the reflective layer 58 may spread within only one enclosed region 62 when the area of the transmissive region is required to be larger than that of the reflective region. In comparison, when the area of the reflective region is required to be larger than that of the transmissive region, the metal layer 3 may spread within two enclosed regions 62. Hence, according to the invention, since the Metal 3 layer M3 are patterned to form both the common electrode sections M3a-M3d and the reflective layer 58 under the same fabrication process, the fabrication of a transflective liquid crystal display is simplified.

Figure 15:
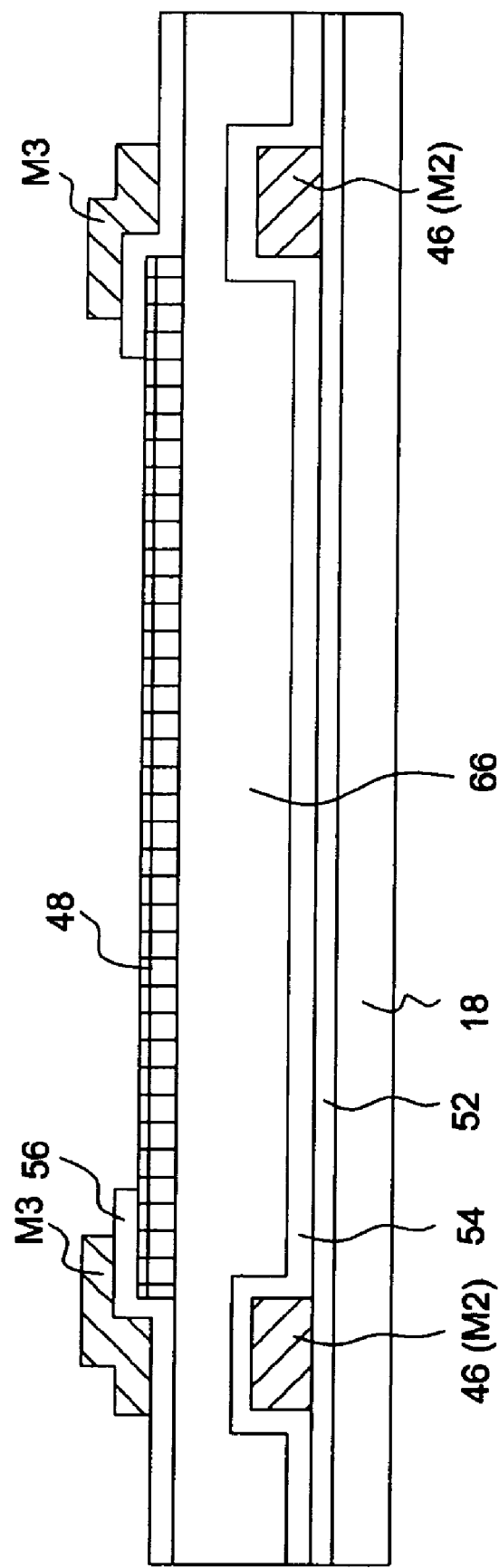
FIG. 15 shows a cross-sectional view illustrating another embodiment of the invention.

FIG. 15 shows a cross-sectional view illustrating another embodiment of the invention. Referring to FIG. 15, during the fabrication processes of a multi-domain LCD, a flattened dielectric layer 66 is additionally formed on the passivation layer 54, and the pixel electrode 48 is formed on the flattened dielectric layer 66. Hence, the formation level of the pixel electrode 48 is raised to allow for more spread areas and thus to improve the aperture ratio of a multi-domain LCD.

Figure 16:
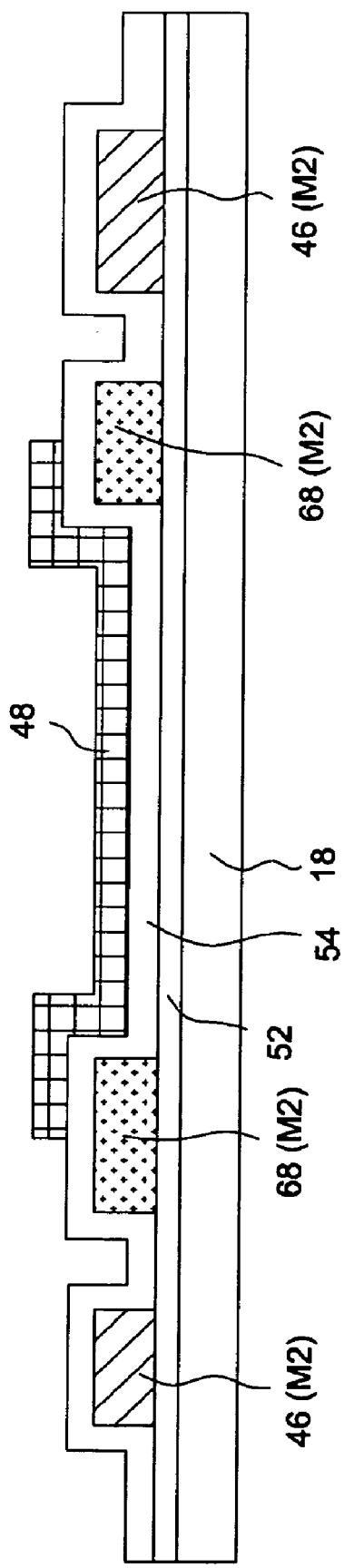
FIG. 16 shows a cross-sectional view illustrating another embodiment of the invention.

FIG. 16 shows a cross-sectional view illustrating another embodiment of the invention. Referring to FIG. 16, a Metal 2 layer M2 is deposited on the gate insulation layer 52, and the Metal 2 layer M2 is patterned to define data lines 46 and a common electrode 68. The common electrode 68 may include multiple sections having a distribution identical to the Metal 3 layer M3 shown in FIG. 4 to produce fringe fields. Also, the overlapped portions between the common electrode 68 and the pixel electrode 48 also form a storage capacitor Cst.

Figure 17:
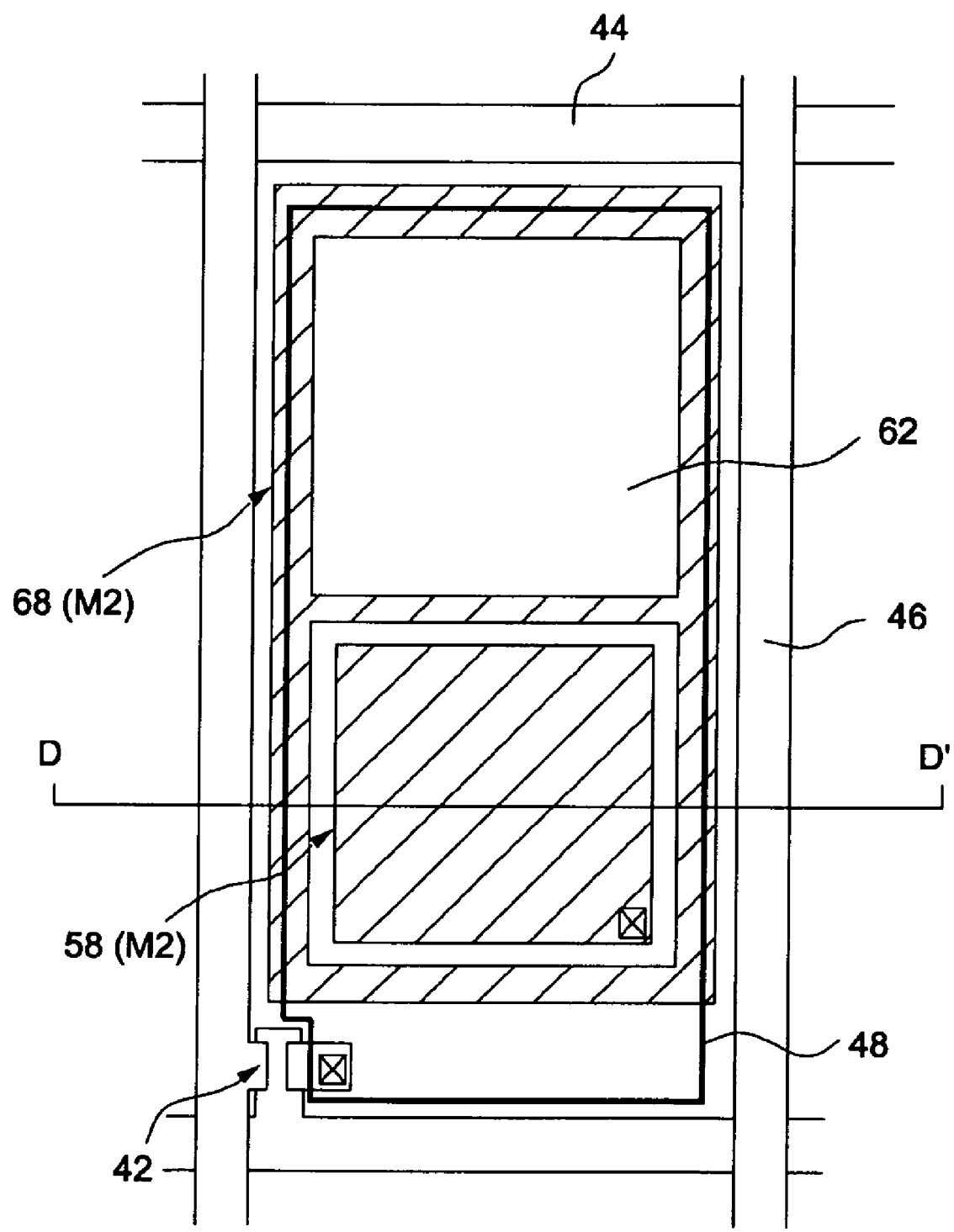
FIG. 17 shows a plan view illustrating a transflective pixel structure according to another embodiment of the invention.
Figure 18:
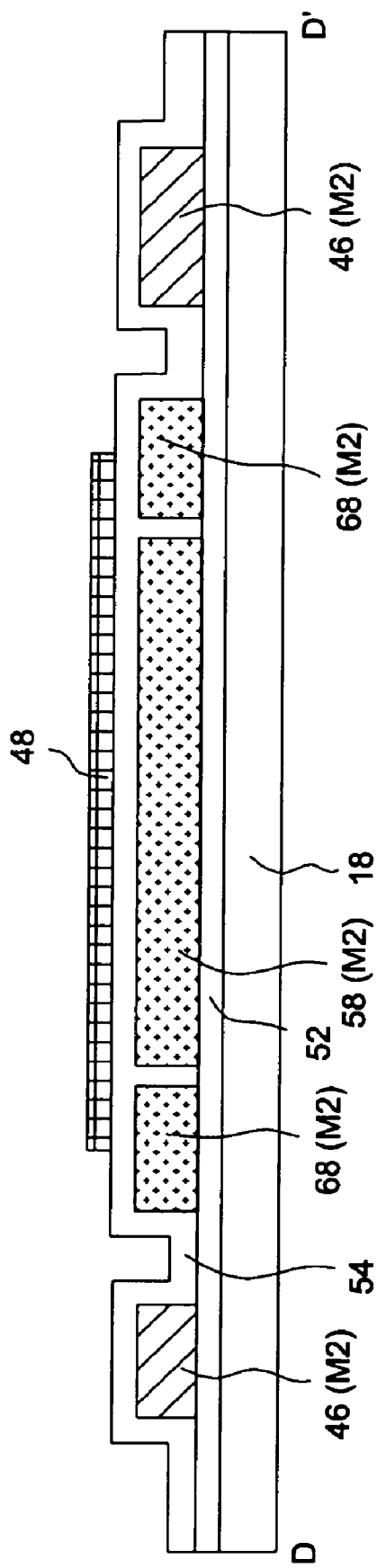
FIG. 18 shows a cross-sectional view taken along line D-D' in FIG. 17.

FIG. 17 shows a plan view illustrating a transflective pixel structure according to another embodiment of the invention, and FIG. 18 shows a cross-sectional view taken along line D-D' in FIG. 17. As shown in both FIG. 17 and FIG. 18, in this embodiment, the Metal 2 layer is made of metallic materials having high reflectivity and patterned to define both the common electrode 68 and a reflective layer 58, with the reflective layer 58 maintaining a gap apart from the common electrode 68 and constituting the reflective region of a transflective liquid crystal display.

Figure 19:
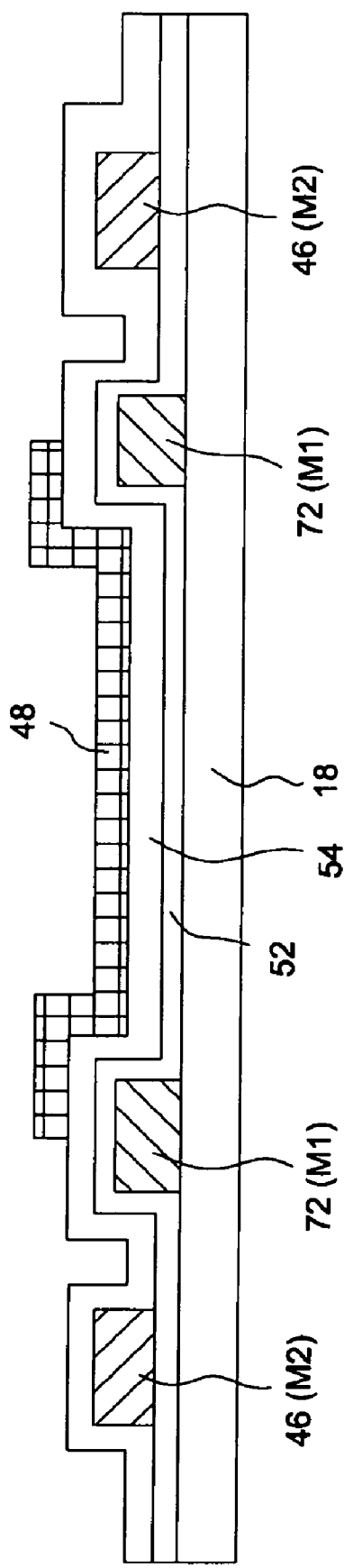
FIG. 19 shows a cross-sectional view illustrating another embodiment of the invention.
Figure 20:
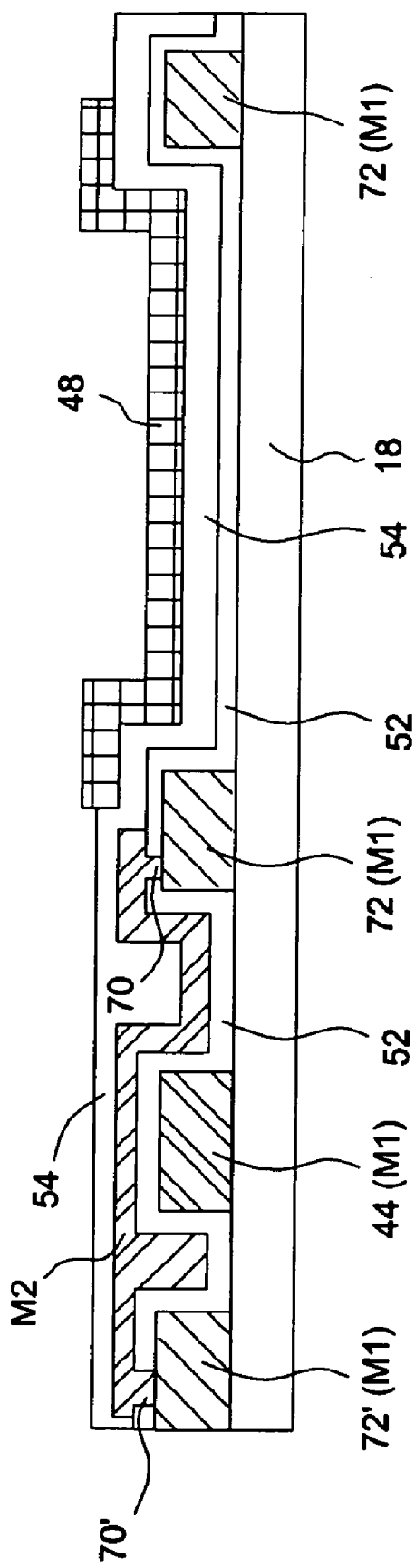
FIG. 20 shows a cross sectional-view illustrating the interconnection between two adjacent pixels according to the embodiment shown in FIG. 19.

FIG. 19 shows a cross-sectional view illustrating another embodiment of the invention. Referring to FIG. 19, a Metal 1 layer M1 is deposited on a transparent substrate 18 and patterned to define the gate lines 44 (not shown) and a common electrode 72. The common electrode 72 may include multiple sections having a distribution identical to the Metal 3 layer M3 shown in FIG. 4 to produce fringe fields. Also, the overlapped portions between the common electrode 72 and the pixel electrode 48 form a storage capacitor Cst. FIG. 20 shows a cross sectional-view illustrating the interconnection between two adjacent pixels according to the embodiment shown in FIG. 19. Referring to FIG. 20, a portion of the gate insulation layer 52 on the common electrode 72 in a first pixel is removed to form a fist contact hole 70, and a portion of the gate insulation layer 52 on the common electrode 72' in a second pixel adjacent to the first pixel is removed to form another contact hole 70'. The contact holes 70 and 70' are connected with each other through a patterned Metal 2 layer M2.

Figure 21:
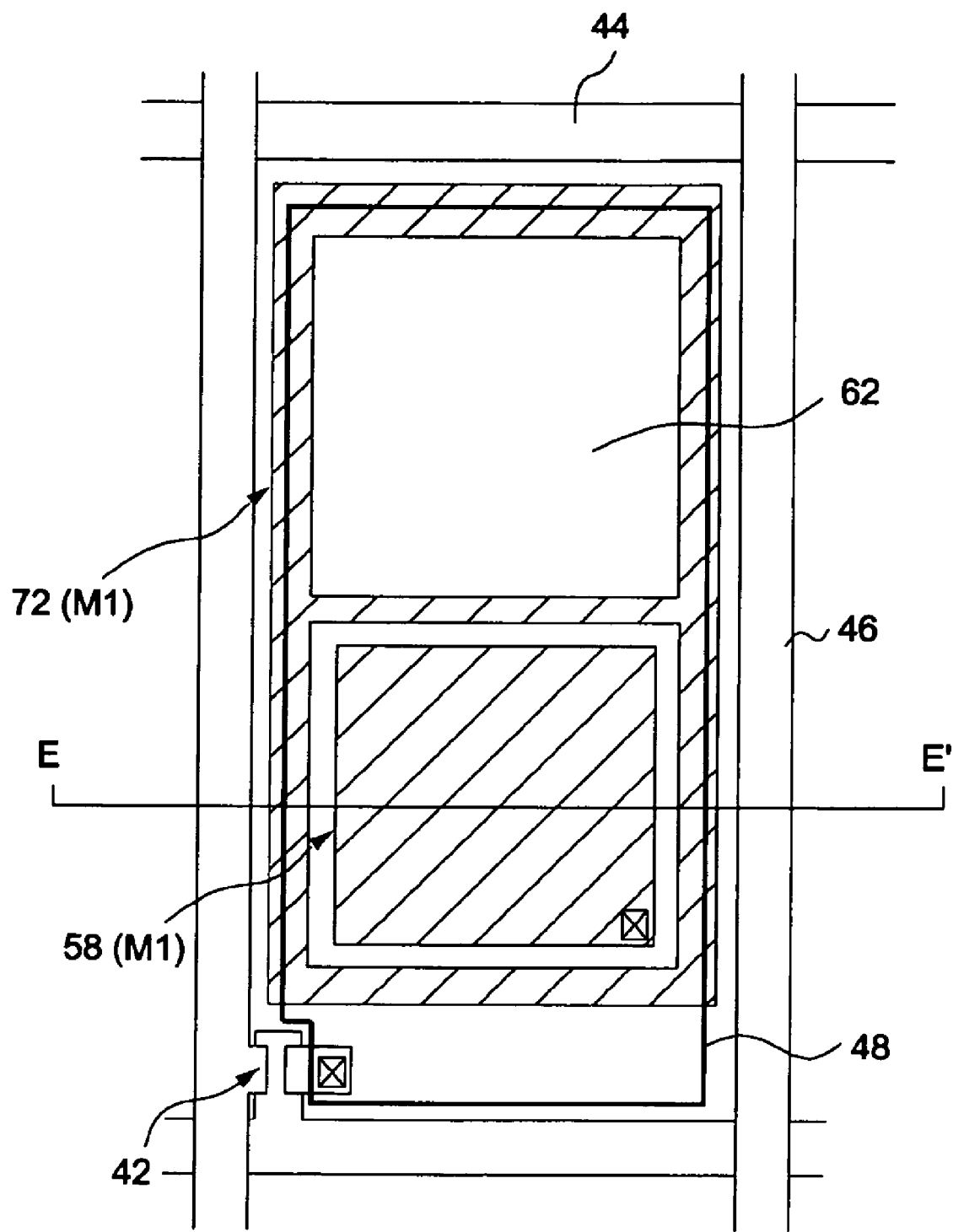
FIG. 21 shows a plan view illustrating a transflective pixel structure according to another embodiment of the invention.
Figure 22:
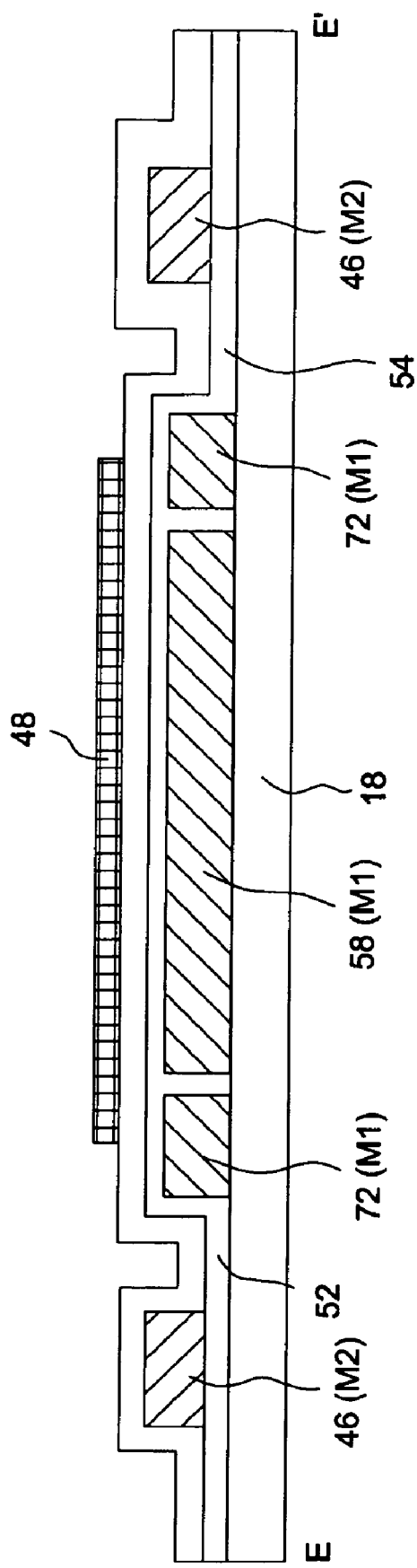
FIG. 22 shows a cross-sectional view taken along line E-E' in FIG. 21.

FIG. 21 shows a plan view illustrating a transflective pixel structure according to another embodiment of the invention, and FIG. 22 shows a cross-sectional view taken along line E-E' in FIG. 21. In this embodiment, the Metal 1 layer is made of metallic materials having high reflectivity and patterned to define both the common electrode 72 and a reflective layer 58, with the reflective layer 58 maintaining a gap apart from the common electrode 72 and constituting the reflective region of a transflective liquid crystal display.

Figure 23:
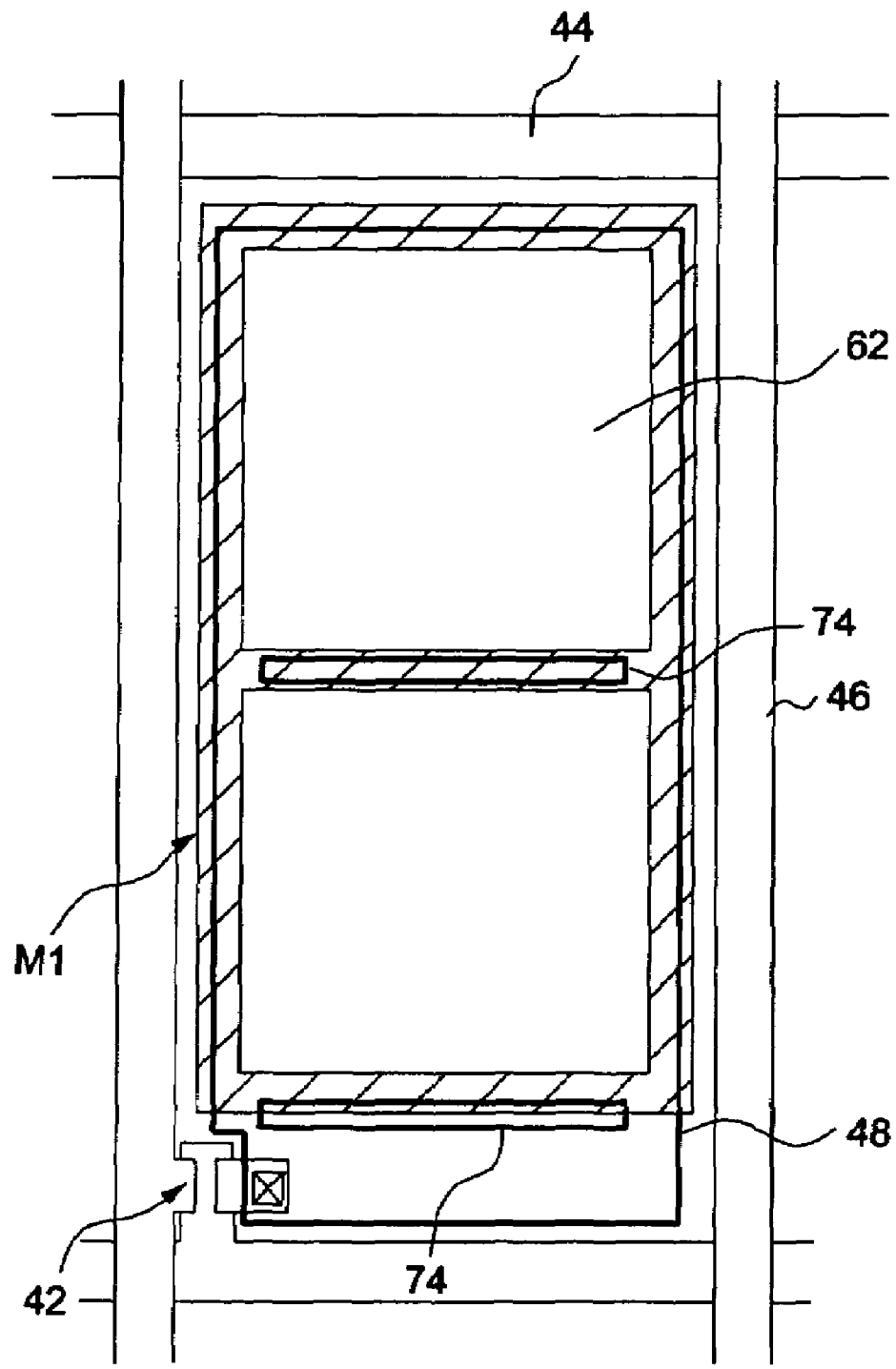
FIG. 23 shows a plan view illustrating another embodiment of the invention.

FIG. 23 shows a plan view illustrating another embodiment of the invention. Referring to FIG. 23, except a Metal 1 layer is patterned to define multiple common electrode sections to produce fringe fields, the pixel electrode 48 is also provided with slits 74 to enhance the field strength for tilting the liquid crystal molecules within selected regions so as to further reduce the areas of a disclination region. Certainly, the common electrode sections may be formed from a Metal 2 layer under the condition that the slits 74 are provided.

Figure 24:
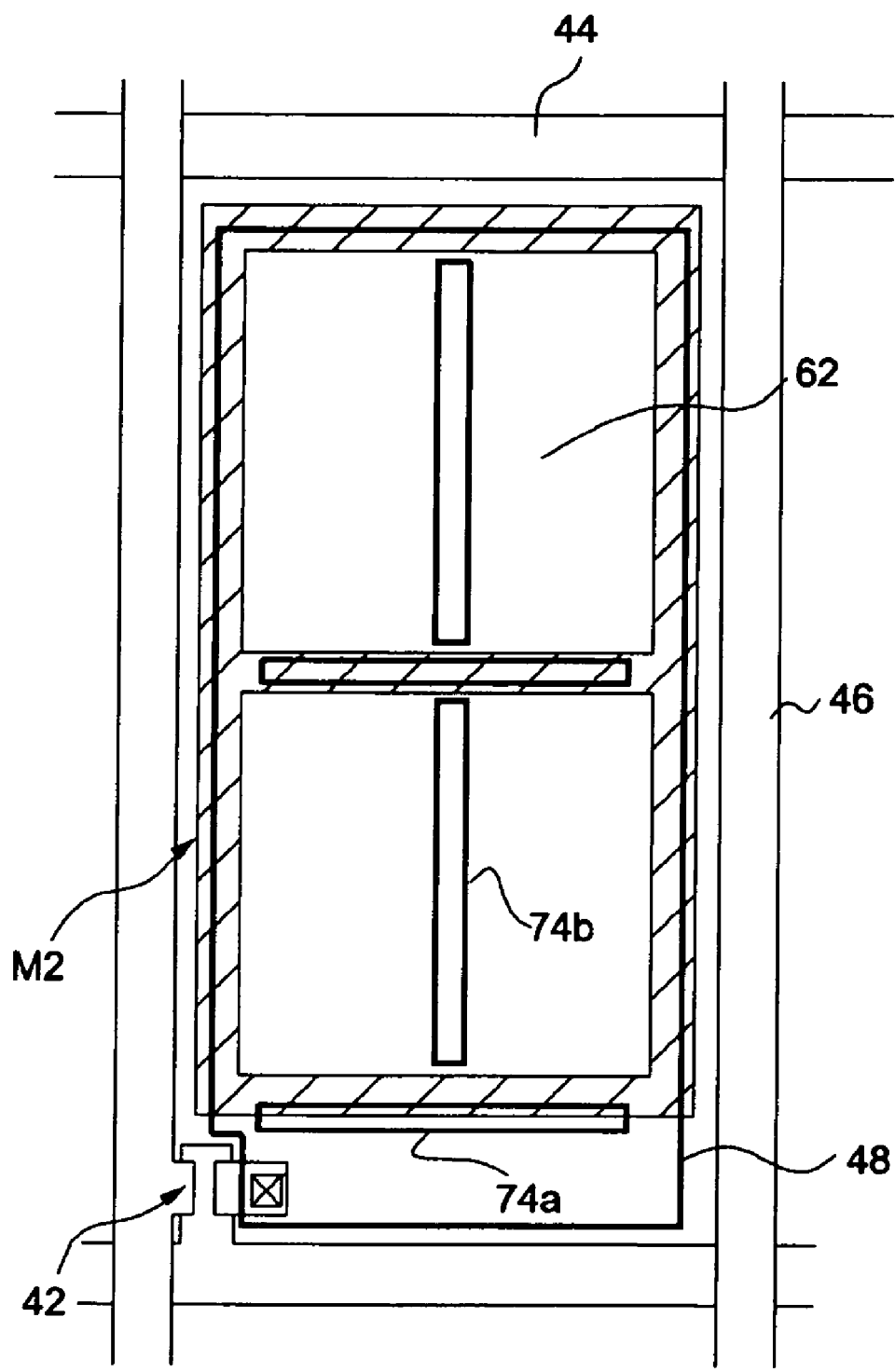
FIG. 24 shows a plan view illustrating another embodiment of the invention.
Figure 25:
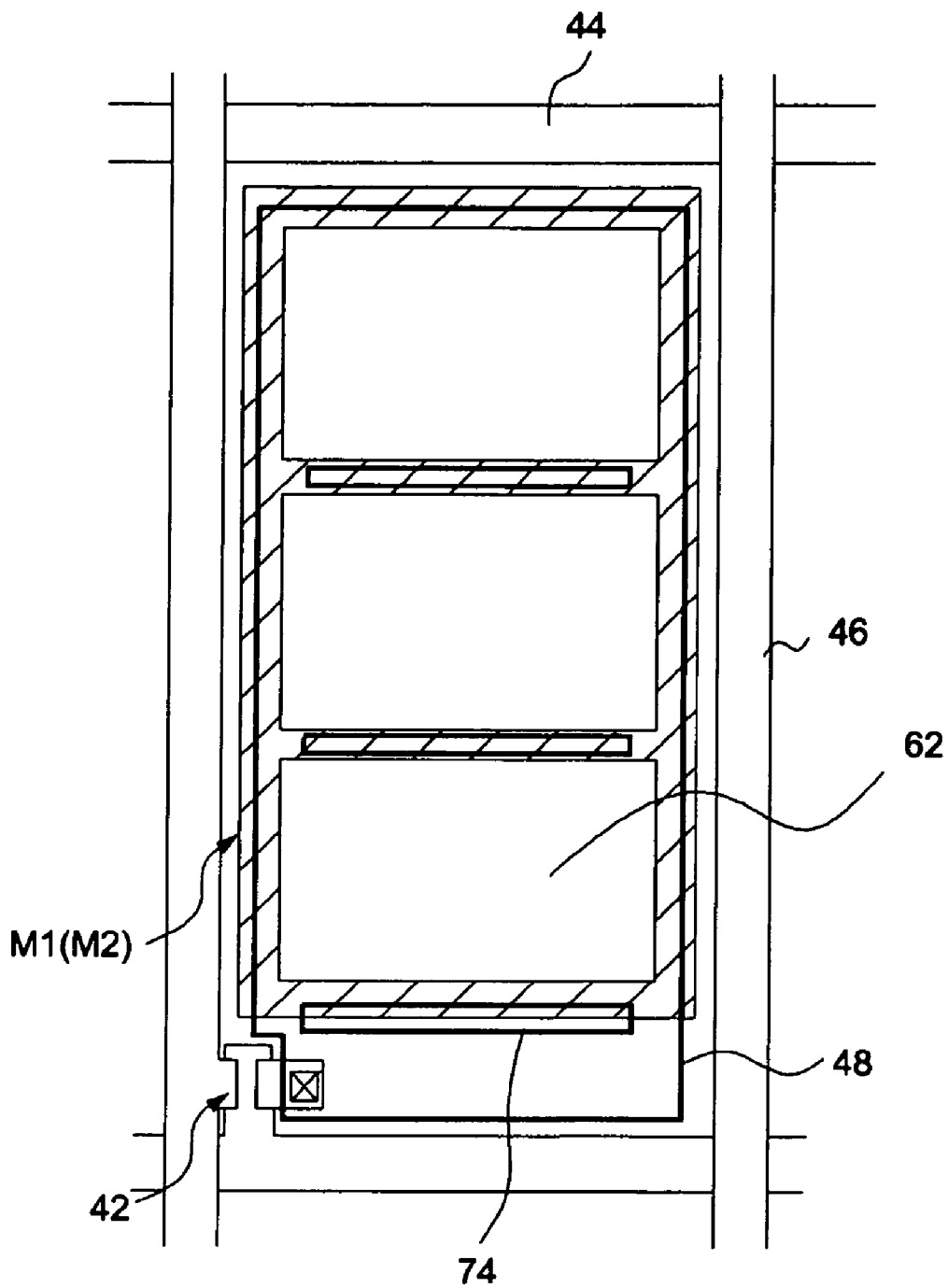
FIG. 25 shows a plan view illustrating another embodiment of the invention.
Figure 26:
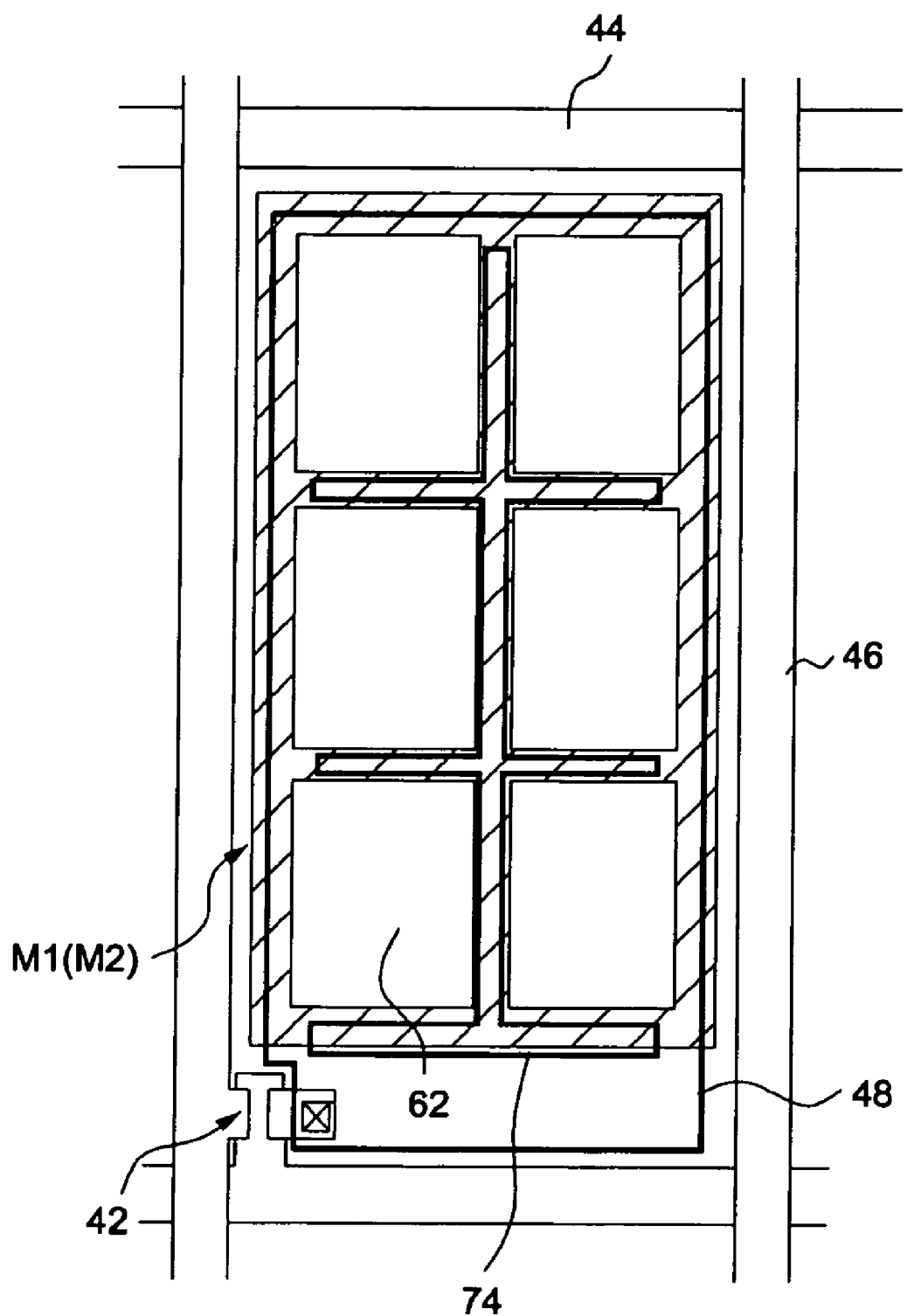
FIG. 26 shows a plan view illustrating another embodiment of the invention.

Further, the shape and location of the slits are not limited. Preferably, the slits 74 may be strip-shaped and substantially parallel to the common electrode sections. For example, as shown in FIG. 24, the pixel electrode 48 may be provided with both slits 74a overlapping the common electrode sections and slits 74b not overlapping the common electrode sections. Moreover, under the condition the common electrode sections together with the slits are both formed to produce fringe fields, the distribution of the common electrode sections is also not limited. For example, each pixel region may be divided into two or three enclosed regions 62 as shown in FIGS. 24 and 25, or alternatively, each pixel region may be divided into six enclosed regions 62 arranged in two columns, as shown in FIG. 26.

Figure 27:
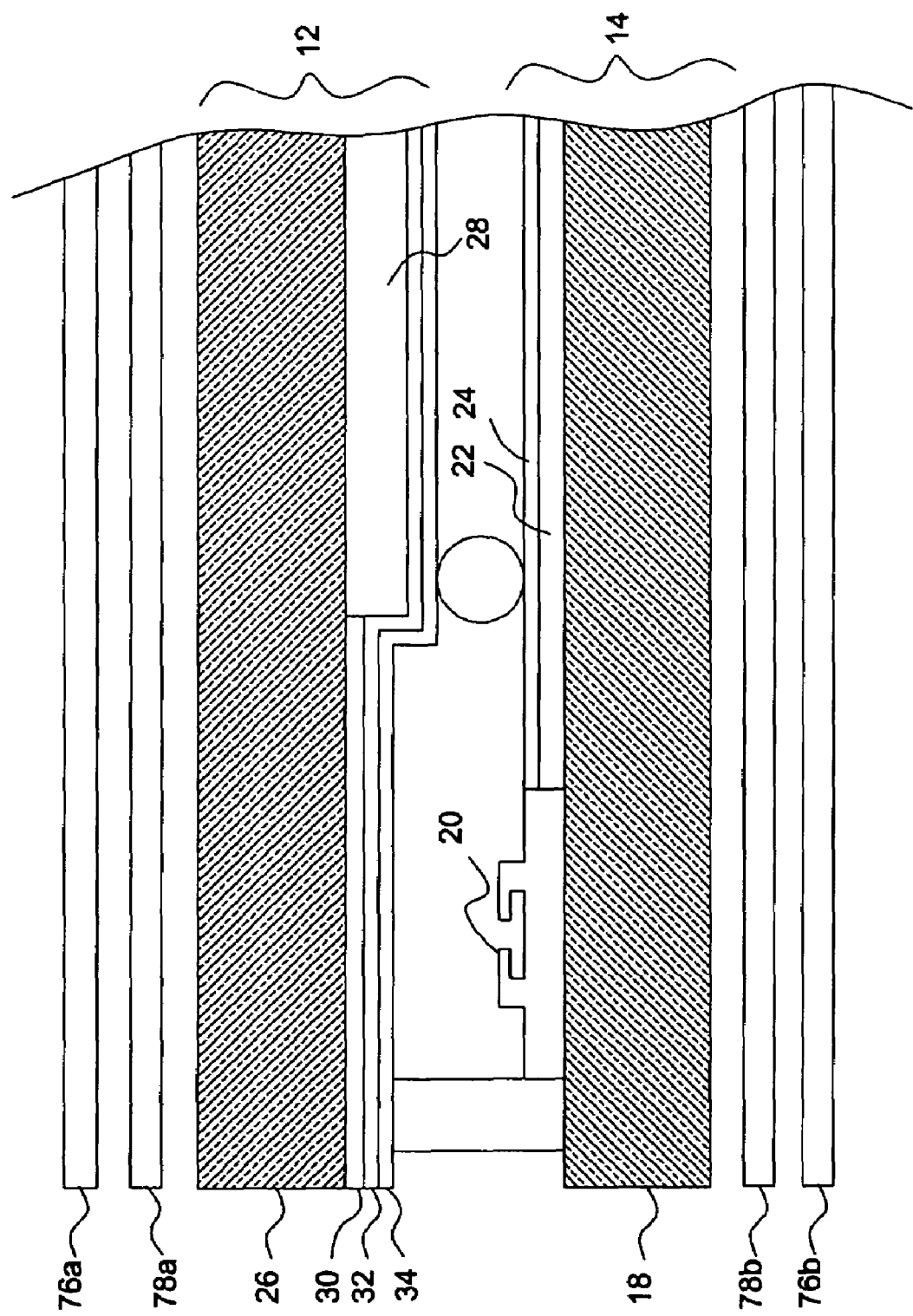
FIG. 27 shows a schematic diagram illustrating another embodiment of a multi-domain LCD according to the invention.

Besides, referring to FIG. 27, a polarizer 76a is positioned next to the transparent substrate 26 and opposite to the liquid crystal layer, and a polarizer 76b is positioned next to the transparent substrate 18 and opposite to the liquid crystal layer. A pair of quarter wavelength plates 78a and 78b are respectively provided between the transparent substrate 26 and the polarizer 76a and between the transparent substrate 18 and the polarizer 76b, so that a linear polarized liquid crystal cell is transformed into a circular polarized liquid crystal cell to improve the light transmittance of a multi-domain LCD.

While the invention has been described by way of examples and in terms of the preferred embodiments, it is to be understood that the invention is not limited to the disclosed embodiments. To the contrary, it is intended to cover various modifications and similar arrangements as would be apparent to those skilled in the art. For example, the gate lines 44 may be defined from the Metal 2 layer, and the data lines 46 may be defined from the Metal 1 layer. Therefore, the scope of the appended claims should be accorded the broadest interpretation so as to encompass all such modifications and similar arrangements.

What is claimed is:

1. A multi-domain liquid crystal display, comprising:
   a first and a second substrates;
   a liquid crystal layer having negative dielectric anisotropy interposed between the first and the second substrates;
   a first common electrode formed on an entire surface of the first substrate;
   a plurality of first and second signals lines provided on the second substrate, wherein two adjacent first signal lines are intersected with two adjacent second signal lines to define a pixel region;
   a plurality of switching devices each provided in the vicinity of each intersection of the first and second signal lines;
   a first dielectric layer formed on the second substrate and covering the first signal lines;
   a second dielectric layer formed on the first dielectric layer and covering the second signal lines;
   a plurality of pixel electrodes formed on the second dielectric layer;
   a third dielectric layer formed overlying the pixel electrodes; and
   a plurality of second common electrodes formed on the third dielectric layer, wherein a voltage difference exists between each second common electrode and each pixel electrode to produce fringe fields.

2. The multi-domain liquid crystal display as claimed in claim 1, wherein each second common electrode includes multiple sections that define at least one enclosed region, with each enclosed region overlapping with the pixel electrode to regulate the orientation of liquid crystal molecules.

3. The multi-domain liquid crystal display as claimed in claim 2, wherein the multiple sections are substantially strip-shaped and parallel to the signal lines to define multiple enclosed regions that are arranged in a single column or in two columns.

4. The multi-domain liquid crystal display as claimed in claim 1, wherein the first dielectric layer is a gate insulation layer, and the second dielectric layer is a passivation layer.

5. The multi-domain liquid crystal display as claimed in claim 1, wherein the second common electrodes are made of transparent conductive materials or metallic conductive materials.

6. The multi-domain liquid crystal display as claimed in claim 1, wherein the switching device is a thin film transistor.

7. The multi-domain liquid crystal display as claimed in claim 1, further comprising a flattened dielectric layer interposed between the second dielectric layer and the pixel electrodes.

8. The multi-domain liquid crystal display as claimed in claim 1, further comprising:
   a reflective layer formed on the third dielectric layer and surrounded by the second common electrodes.

9. The multi-domain liquid crystal display as claimed in claim 1, wherein the overlapped portions between the second common electrodes and the pixel electrodes form a storage capacitor.

10. The multi-domain liquid crystal display as claimed in claim 1, wherein the liquid crystal layer comprises an additive of chiral dopant.

11. The multi-domain liquid crystal display as claimed in claim 1, further comprising:
   a first polarizer positioned next to the first substrate and opposite to the liquid crystal layer;
   a second polarizer positioned next to the second substrate and opposite to the liquid crystal layer;

a first quarter wavelength plate provided between the first polarizer and the first substrate; and a second quarter wavelength plate provided between the second polarizer and the second substrate.

12. A multi-domain liquid crystal display, comprising:

a first and a second substrates;

a liquid crystal layer having negative dielectric anisotropy interposed between the first and the second substrates;

a common electrode formed on an entire surface of the first substrate;

a Metal 1 layer formed on the second substrate and patterned to define first signal lines and the gate of a thin film transistor;

a first dielectric layer formed overlying the Metal 1 layer;

a Metal 2 layer formed on the first dielectric layer and patterned to define second signal lines and the drain and the source of the thin film transistor;

a second dielectric layer formed overlying the Metal 2 layer;

a plurality of pixel electrodes formed on the second dielectric layer;

a third dielectric layer formed overlying the pixel electrodes; and a Metal 3 layer formed on the third dielectric layer, wherein the Metal 3 layer is patterned to define a first and a second parts apart from each other, the first part is connected to the common electrode to produce fringe fields, and the second part is surrounded by the first part and formed as a reflective layer.

13. The multi-domain liquid crystal display as claimed in claim 12, wherein the first part of the Metal 3 layer includes multiple sections that define at least one enclosed region, with each enclosed region overlapping with the pixel electrode to regulate the orientation of liquid crystal molecules.

14. The multi-domain liquid crystal display as claimed in claim 13, wherein the multiple sections are substantially strip-shaped and parallel to the first signal lines and the second signal lines to define multiple enclosed regions that are arranged in a single column or in two columns.

15. A multi-domain liquid crystal display, comprising:

a first and a second substrates;

a liquid crystal layer having negative dielectric anisotropy interposed between the first and the second substrates;

a first common electrode formed on an entire surface of the first substrate;

a plurality of first and second signals lines provided on the second substrate, wherein two adjacent first signal lines are intersected with two adjacent second signal lines to define a pixel region;

a plurality of switching devices each provided in the vicinity of each intersection of the first and second signal lines;

a first dielectric layer formed on the second substrate and covering the first signal lines;

a second dielectric layer formed on the first dielectric layer and covering the second signal lines;

a plurality of pixel electrodes formed on the second dielectric layer; and a plurality of second common electrodes formed on the second substrate, wherein each second common electrode is divided into a first part and a second part, the first part includes multiple sections to produce fringe fields, and the second part is surrounded by the multiple sections of the first part and formed as a reflective layer.

16. The multi-domain liquid crystal display as claimed in claim 15, wherein the second common electrodes are formed from a Metal 1 layer or a Metal 2 layer.

17. The multi-domain liquid crystal display as claimed in claim 15, wherein the multiple sections of the first part define at least one enclosed region, with each enclosed region overlapping with the pixel electrode to regulate the orientation of liquid crystal molecules.

18. The multi-domain liquid crystal display as claimed in claim 17, wherein the multiple sections are substantially strip-shaped and parallel to the first and second signal lines to define multiple enclosed regions that are arranged in a single column or in two columns.

* * * * *